(12) United States Patent
Nishitani et al.

(10) Patent No.: US 10,171,008 B2
(45) Date of Patent: Jan. 1, 2019

(54) VIBRATION WAVE MOTOR AND DRIVING APPARATUS USING THE VIBRATION WAVE MOTOR

(71) Applicant: CANON KABUSHIKI KAISHA, Tokyo (JP)

(72) Inventors: Hitoshi Nishitani, Tokyo (JP); Shunsuke Ninomiya, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 14/884,190

(22) Filed: Oct. 15, 2015

(65) Prior Publication Data

US 2016/0118913 A1 Apr. 28, 2016

(30) Foreign Application Priority Data

Oct. 27, 2014 (JP) ................. 2014-218080

(51) Int. Cl.
| | |
|---|---|
| *H01L 41/09* | (2006.01) |
| *H02N 2/00* | (2006.01) |
| *H02N 2/02* | (2006.01) |

(52) U.S. Cl.
CPC ............ *H02N 2/001* (2013.01); *H02N 2/026* (2013.01)

(58) Field of Classification Search
CPC ......... H02N 2/001; H02N 2/026; H01L 41/09
USPC ................. 310/323.01–323.21, 328
See application file for complete search history.

(56) References Cited

U.S. PATENT DOCUMENTS

| | | | | | |
|---|---|---|---|---|---|
| 5,241,235 A | * | 8/1993 | Culp | ................. | G01P 15/09 310/328 |
| 5,866,970 A | * | 2/1999 | Oone | ................. | H02N 2/004 310/323.06 |
| 6,091,179 A | * | 7/2000 | Tobe | ................. | H02N 2/004 310/323.01 |

(Continued)

FOREIGN PATENT DOCUMENTS

| | | |
|---|---|---|
| CN | 101257264 A | 9/2008 |
| CN | 101388619 A | 3/2009 |

(Continued)

OTHER PUBLICATIONS

Office Action dated May 5, 2017, in Chinese Patent Application No. 201510695455.4.

(Continued)

*Primary Examiner* — Thomas Dougherty
(74) *Attorney, Agent, or Firm* — Venable LLP

(57) ABSTRACT

A vibration wave motor includes a vibrating plate having a rectangular surface; a piezoelectric device bonded to the vibrating plate, and configured to vibrate at high frequency; and a projection provided on the vibrating plate or the piezoelectric device. In the vibration wave motor, a natural vibration mode, which has a resonant frequency equal to or adjacent to a resonant frequency of torsional vibration in a natural vibration mode under a state in which the vibrating plate, the piezoelectric device, and the projection are integrated, is a natural vibration mode of bending vibration in a direction parallel to or orthogonal to a torsion center axis of the torsional vibration in the natural vibration mode. The projection is provided at a position closer to an antinode than to a node, which are in the direction orthogonal to the torsion center axis of the torsional vibration in the natural vibration mode.

17 Claims, 23 Drawing Sheets

(56) References Cited

U.S. PATENT DOCUMENTS

| | | | |
|---|---|---|---|
| 6,392,328 B1* | 5/2002 | Ashizawa | H02N 2/004 310/323.01 |
| 6,979,936 B1* | 12/2005 | Ganor | B26B 19/28 310/323.01 |
| 7,233,096 B2 | 6/2007 | Maruyama et al. | |
| 8,643,252 B2 | 2/2014 | Oda et al. | |
| 9,564,837 B2 | 2/2017 | Oda et al. | |
| 2006/0250047 A1* | 11/2006 | Yamamoto | H02N 2/001 310/317 |
| 2007/0108870 A1* | 5/2007 | Atsuta | H02N 2/008 310/317 |
| 2009/0072664 A1 | 3/2009 | Nagata et al. | |
| 2014/0285066 A1 | 9/2014 | Yamamoto | |

FOREIGN PATENT DOCUMENTS

| | | |
|---|---|---|
| CN | 102244191 A | 11/2011 |
| JP | 63-262068 A | 10/1988 |
| JP | 2005-168281 A | 6/2005 |
| JP | 2012-16107 A | 1/2012 |
| JP | 2013-021777 A | 1/2013 |
| JP | 2014-183724 A | 9/2014 |

OTHER PUBLICATIONS

Office Action dated Jul. 26, 2018, in Japanese Patent Application No. 2014-218080.

* cited by examiner

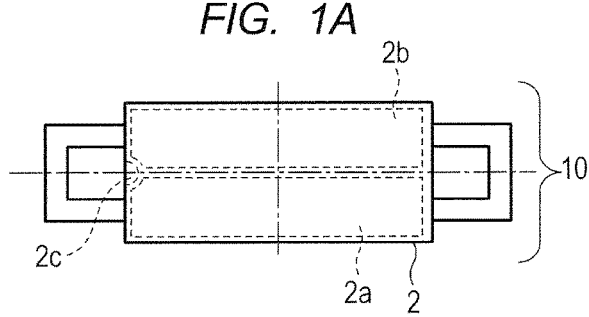
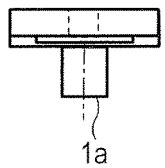
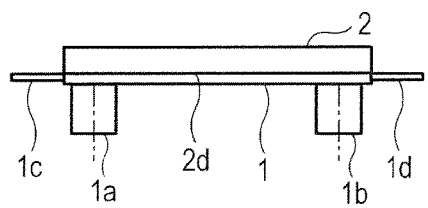
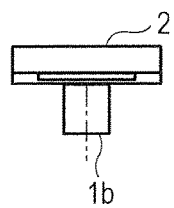
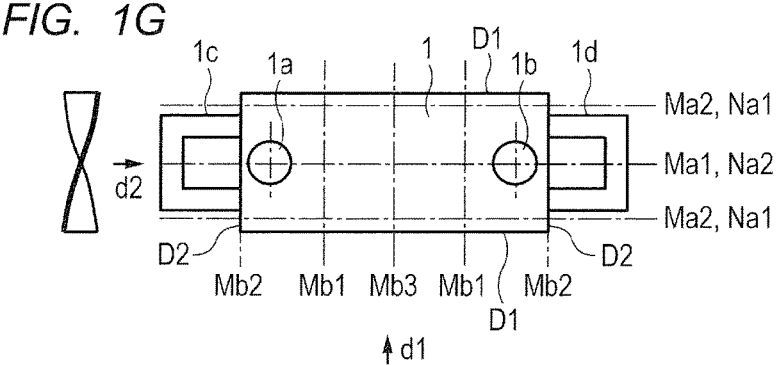

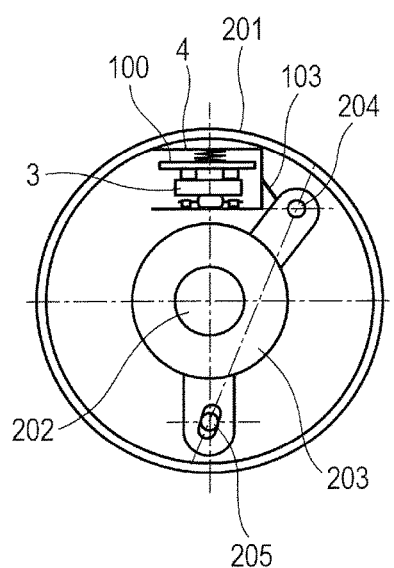
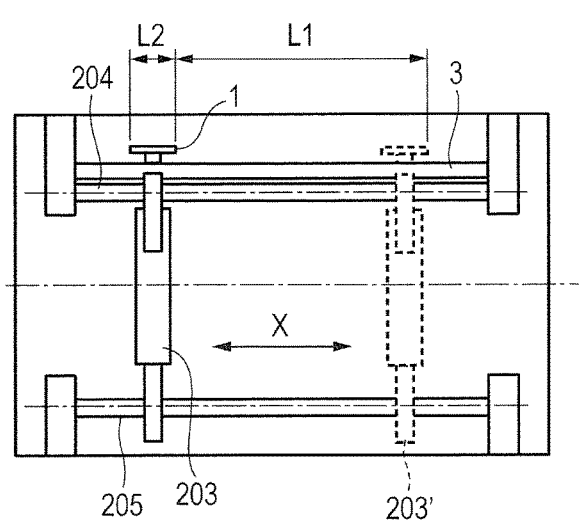
FIG. 5A  FIG. 5B
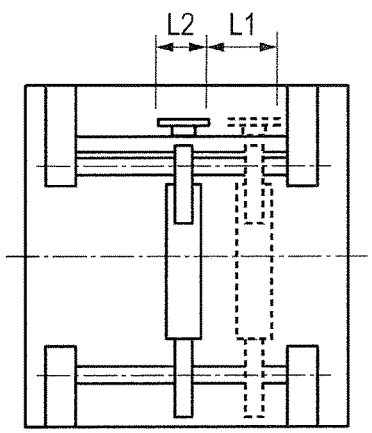
FIG. 5C

FIG. 10A
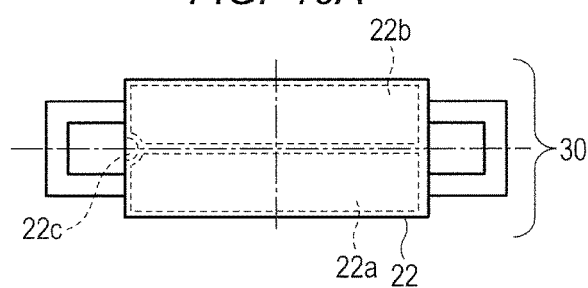
FIG. 10C   FIG. 10B   FIG. 10D
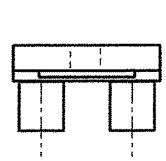 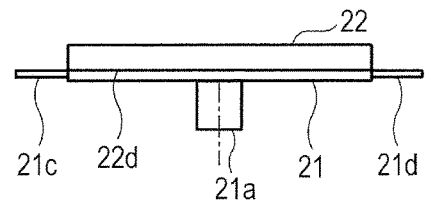 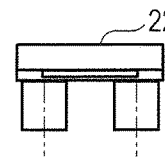
FIG. 10E
FIG. 10H  FIG. 10G
 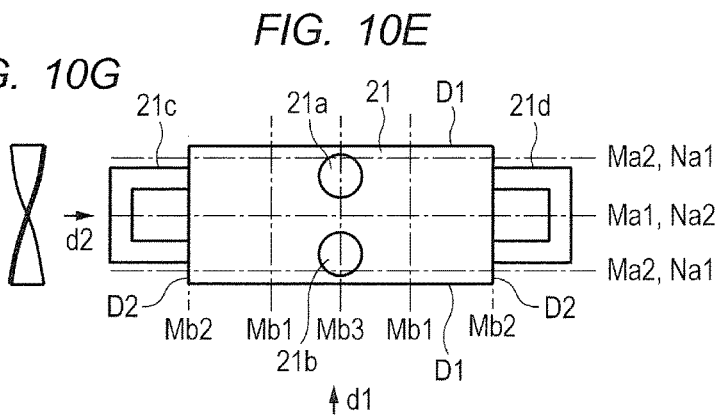

FIG. 11A
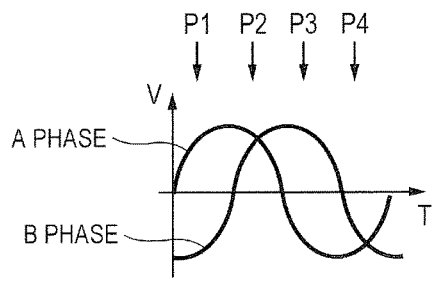
FIG. 11C    FIG. 11B    FIG. 11D
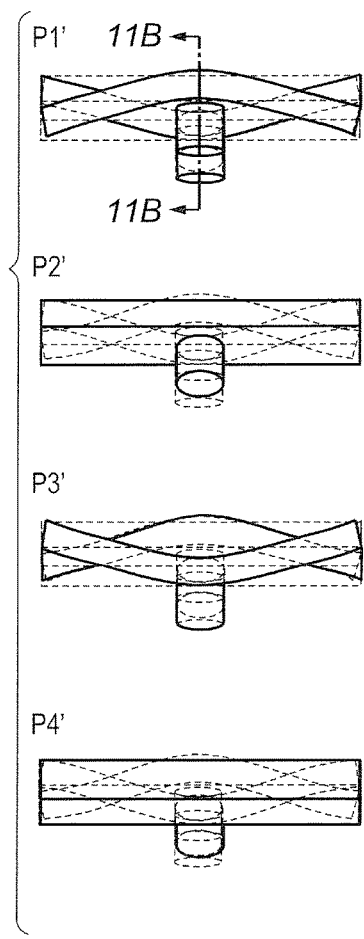
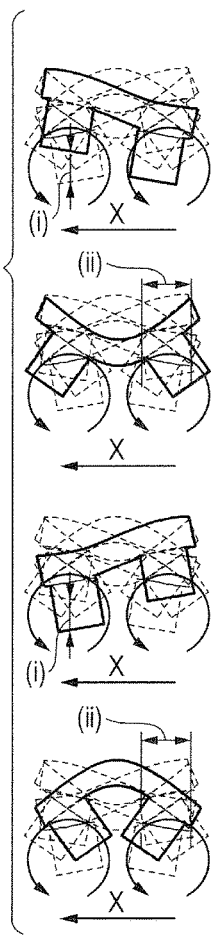
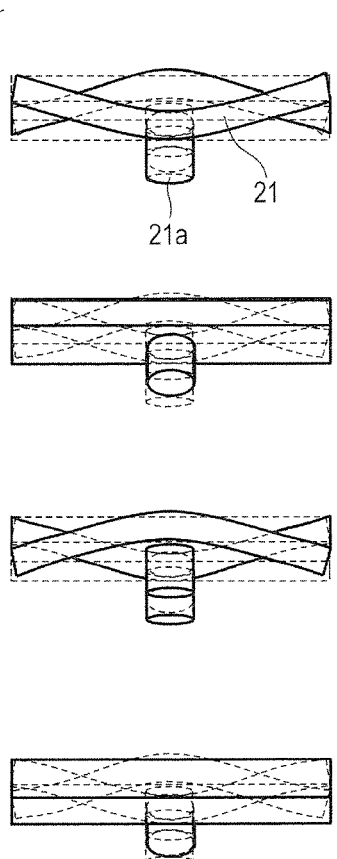

FIG. 12A
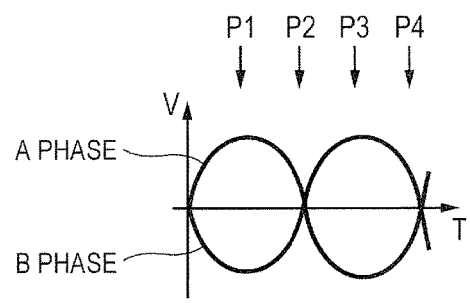
FIG. 12C  FIG. 12B  FIG. 12D
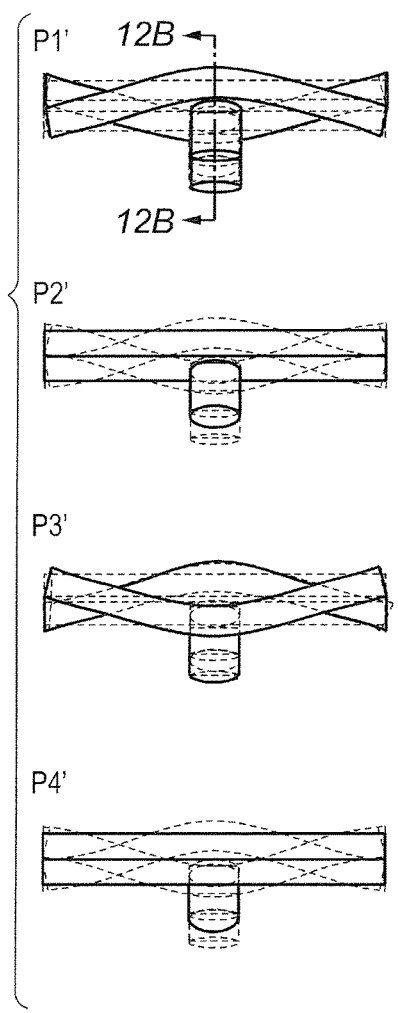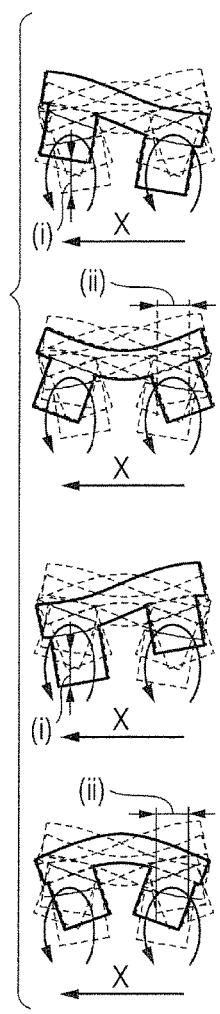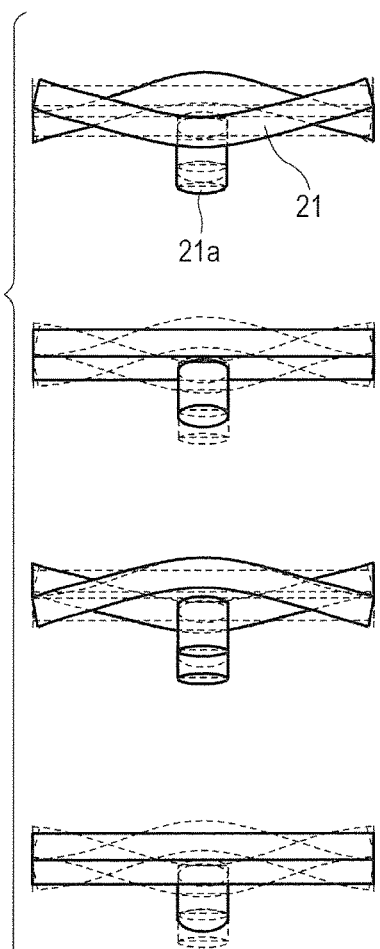

FIG. 13A
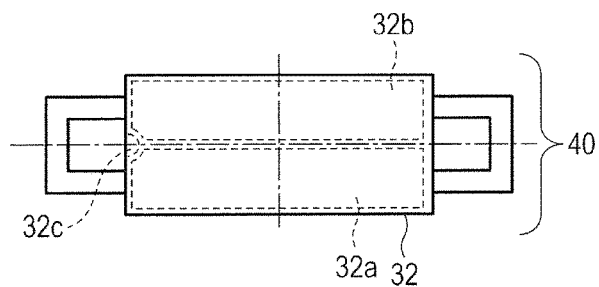
FIG. 13C    FIG. 13B    FIG. 13D
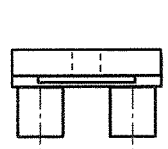 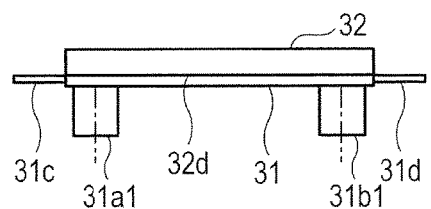 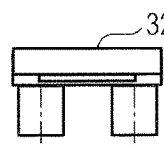
FIG. 13E
FIG. 13H  FIG. 13G
 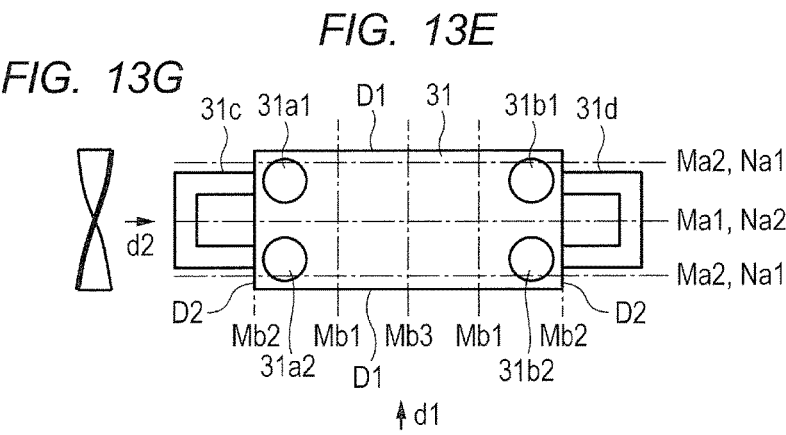

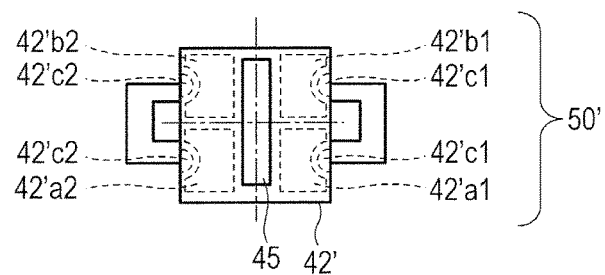
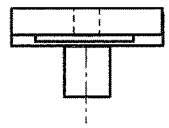
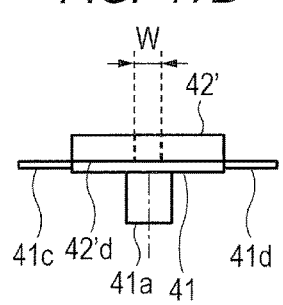
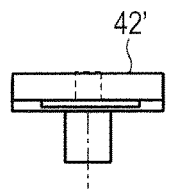
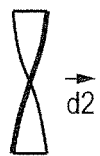
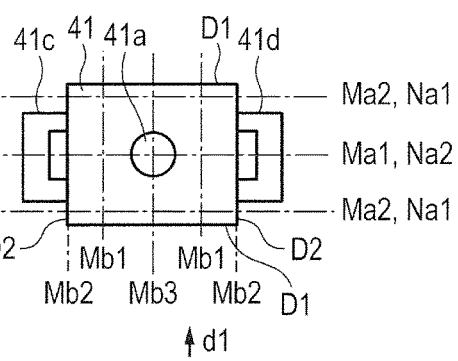

FIG. 18A
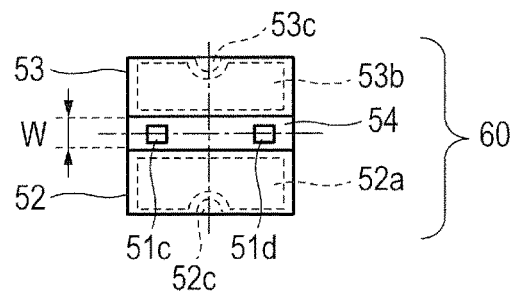
FIG. 18C
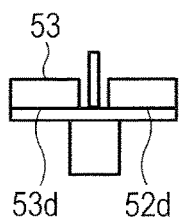
FIG. 18B
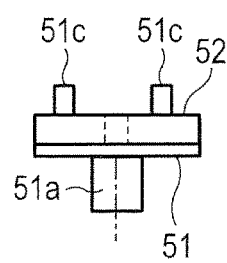
FIG. 18D
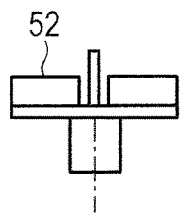
FIG. 18E
FIG. 18G
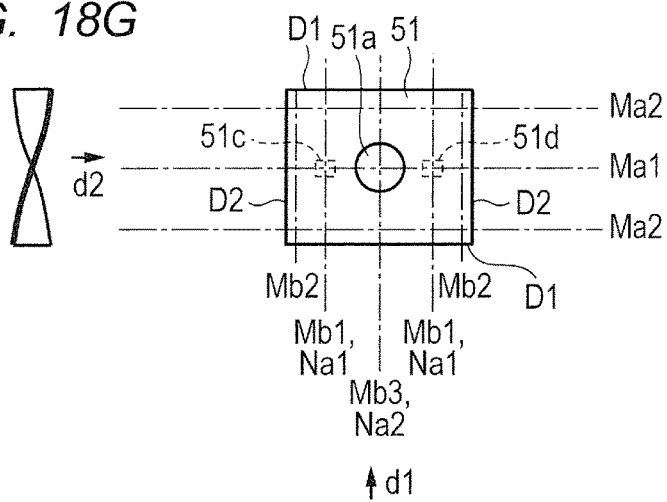

FIG. 19A
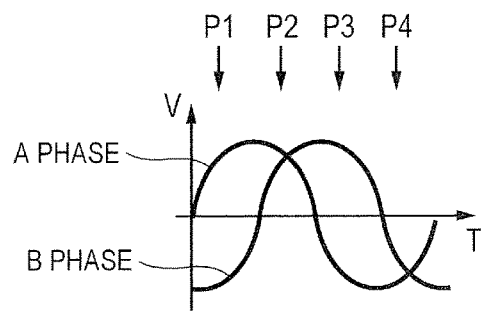
FIG. 19C
FIG. 19B
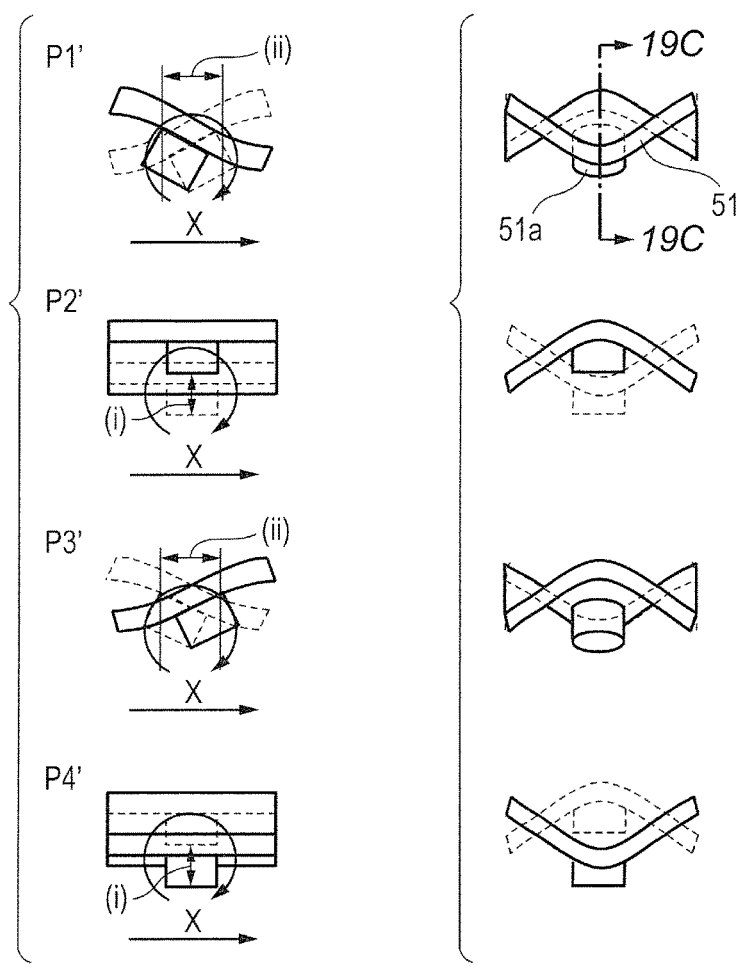

FIG. 20A
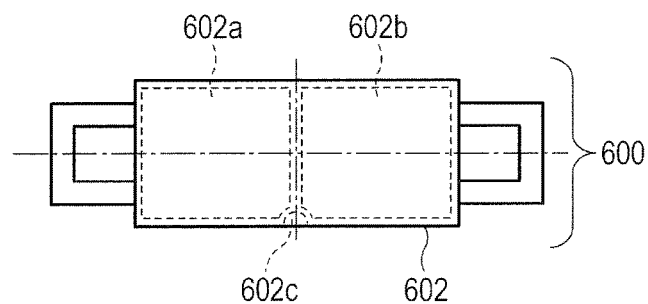
FIG. 20C  FIG. 20B  FIG. 20D
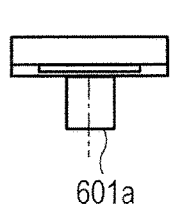 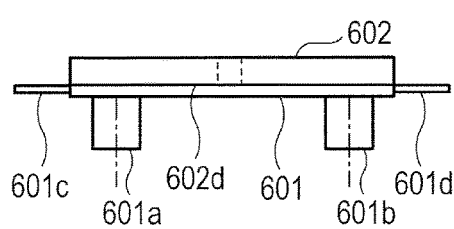 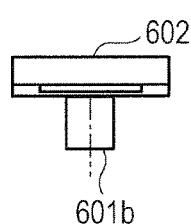
FIG. 20E
FIG. 20G
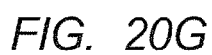
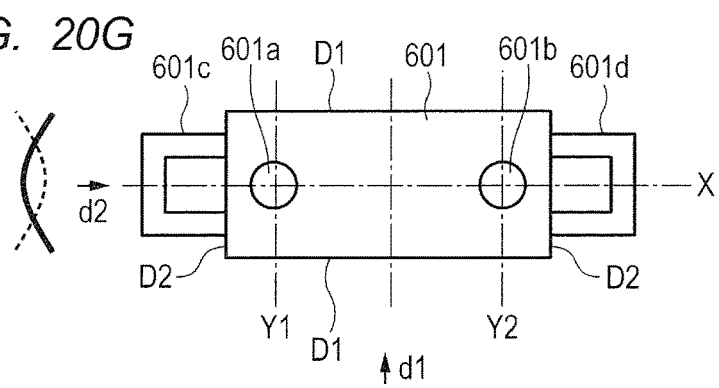
FIG. 20F

FIG. 21A
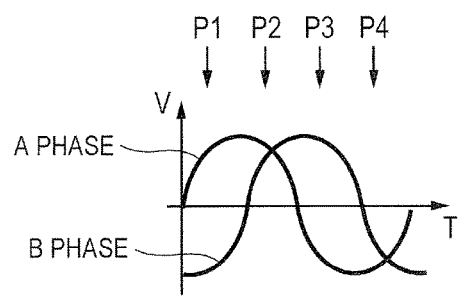
FIG. 21C    FIG. 21B    FIG. 21D
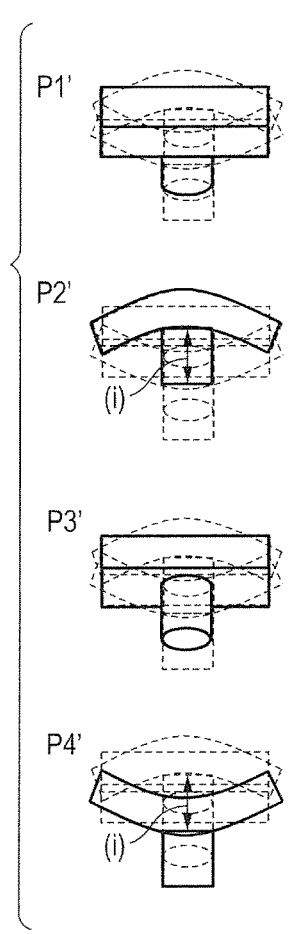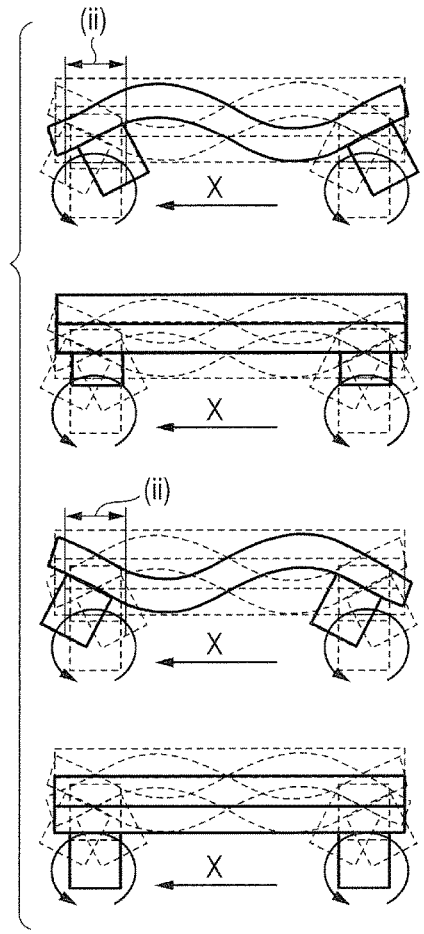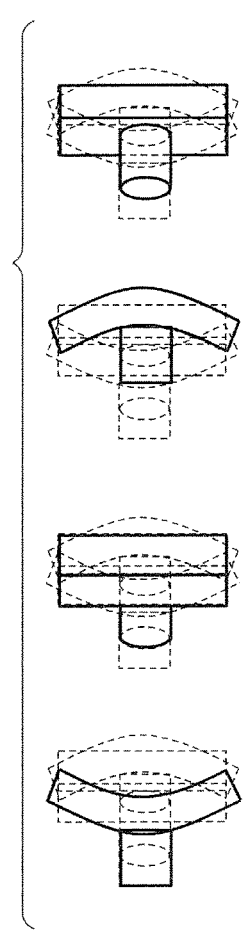

VIBRATION WAVE MOTOR AND DRIVING APPARATUS USING THE VIBRATION WAVE MOTOR

BACKGROUND OF THE INVENTION

Field of the Invention

The present invention relates to a vibration wave motor, and more particularly, to a vibration wave motor for linear drive including a plate-like elastic body. The present invention also relates to a driving apparatus using the vibration wave motor and to a driving apparatus including the vibration wave motor described above.

Description of the Related Art

Hitherto, vibration wave motors with features of small-size and lightweight, high-speed drive, and quiet drive have been employed for lens barrels of image pickup apparatus. Among the vibration wave motors, the following vibration wave motor is described in Japanese Patent Application Laid-Open No. 2012-16107 as a vibration wave motor for linear drive.

FIG. 20A to FIG. 20G are diagrams for illustrating a configuration of a related-art vibration wave motor 600. FIG. 20A is a plan view, FIG. 20B is a front view, FIG. 20C and FIG. 20D are side views, and FIG. 20E is a bottom view. In FIG. 20A to FIG. 20G, a vibrating plate 601 has a rectangular surface. On the rectangular surfaces of the vibrating plate 601, two projections 601a and 601b are provided.

A piezoelectric device 602 having a rectangular shape that vibrates at high frequency is bonded to the surface of the vibrating plate 601 on a side opposite to the surface where the projections 601a and 601b are provided. The piezoelectric device 602 includes two regions obtained by polarization in the same direction, that is, regions 602a and 602b. The region 602a is allocated to an A-phase, whereas the region 602b is allocated to a B-phase. An unpolarized region 602c serves as an electrode to be used as a ground that is conductive to a full-scale electrode on a back surface 602d of the piezoelectric device 602 through a side surface.

Further, coupling portions 601c and 601d to be directly or indirectly coupled to a vibrator holding member (not shown) move in synchronization with the vibrating plate 601. The coupling portions 601c and 601d are provided to shorter sides D2 of the rectangular surface of the vibrating plate 601. As described above, the vibrating plate 601 and the piezoelectric device 602 form the vibrating wave motor 600.

In FIG. 20E, an illustration is made of a node and antinodes of torsional vibration in a secondary natural vibration mode in a direction of longer sides D1 under a state in which the vibrating plate 601, the piezoelectric device 602, and the projections 601a and 601b are integrated. In FIG. 20E, a node and antinodes of bending vibration in a primary natural vibration mode in a direction of the shorter sides D2 are illustrated. Further, FIG. 20F is an illustration of the bending vibration in a secondary natural vibration mode in the direction of the longer sides D1 as viewed in a direction indicated by the arrow d1. FIG. 20G is an illustration of the bending vibration in the primary natural vibration mode in the direction of the shorter sides D2 as viewed in a direction indicated by the arrow d2. In FIG. 20F and FIG. 20G, the illustration of the projections 601a and 601b, the coupling portions 601c and 601d, and the piezoelectric device 602 is omitted.

In FIG. 20E, the antinode of the bending vibration in the primary natural vibration mode in the direction of the shorter sides D2 is indicated by X, whereas the nodes of the bending vibration in the secondary natural vibration mode in the direction of the longer sides D1 are indicated by Y1 and Y2. The projections 601a and 601b are formed in the vicinity of the antinode (indicated by X) of the bending vibration in the primary natural vibration mode in the direction of the shorter sides D2 as well as in the vicinity of the nodes (indicated by Y1 and Y2) of the bending vibration in the secondary natural vibration mode in the direction of the longer sides D1. Further, by applying AC voltages from a power feeding unit (not shown) with a phase difference between the A-phase and the B-phase being freely changed, the vibration with vibration waves can be caused.

FIG. 21A to FIG. 21D are illustrations of a state of the vibration when the AC voltages are applied with the B-phase being delayed by about +90° with respect to the A-phase. FIG. 21A is a graph of changes in the AC voltages applied to the A-phase and the B-phase of the piezoelectric device. FIG. 21B, FIG. 21C, and FIG. 21D correspond to FIG. 20B, FIG. 20C, and FIG. 20D, and are illustrations of changes in vibration with time from P1' to P4'.

Further, in FIG. 21A, the illustration of the piezoelectric device 602 and the coupling portions 601c and 601d is omitted. With respect to electric changes P1 to P4 in the AC voltage shown in FIG. 21A, the mechanical changes P1' to P4' in vibration illustrated in FIG. 21B, FIG. 21C, and FIG. 21D have a predetermined mechanical response delay time. Further, an amplitude of the vibration is illustrated in an exaggerated manner. The details of the driving principle and speed control of the vibration wave motor 600 are described in Japanese Patent Application Laid-Open No. 2012-16107.

In recent years, there is a growing need of downsizing electronic equipment in which the vibration wave motor is mounted, in particular, a lens driving apparatus. As described below, however, the related-art vibration wave motor has a limitation to downsize the apparatus.

First, a configuration of a linear driving apparatus using the related-art vibration wave motor is described. FIG. 22A and FIG. 22B are schematic diagrams of a linear driving apparatus 700 using the related-art vibration wave motor. FIG. 22A is a diagram as viewed in a movement direction of the vibration wave motor, and FIG. 22B is a sectional view taken along the line 22B-22B of FIG. 22A. As illustrated in FIG. 22A and FIG. 22B, the vibration wave motor includes the vibrating plate 601 and the piezoelectric device 602. Further, the vibration wave motor further includes a friction member 701 fixed to a frame body (not shown) with which the projections 601a and 601b come into contact for frictional driving, and rollers 702 provided on a back surface of the friction member 701 so as to rotationally slide thereon.

The vibration wave motor further supports the vibrating plate 601 by the coupling portions 601c and 601d, and further includes a holding member 703 for holding a vibrator that connects the rollers 702. The vibration wave motor further includes a pressure spring 704 and a drive transmitting portion 705. The pressure spring 704 has an upper end acting on the holding member 703 and a lower end acting on the piezoelectric device 602. The drive transmitting portion 705 is configured to be coupled with a driven body. By a pressurizing force of the pressure spring 704, the projections 601a and 601b are brought into pressure-contact with the friction member 701, and obtain a thrust force in the X-direction illustrated in FIG. 22B by a driving force generated by circular motion indicated by the arrows B illustrated in FIG. 22B.

Next, a configuration of the lens driving apparatus in which the linear driving apparatus using the related-art vibration wave motor is mounted is described. FIG. 23A to FIG. 23C are schematic views of a lens driving portion. FIG. 23A is a front view in an optical axis direction, and FIG. 23B and FIG. 23C are side views in which a frame body is partially broken away. FIG. 23C is an illustration of a lens driving apparatus that is further downsized as compared with that illustrated in FIG. 23B. In FIG. 23A to FIG. 23C, the lens driving apparatus includes a frame body 801, a lens 802, a lens holder 803, and guiding shafts 804 and 805 that support the lens holder 803 and guide the lens holder 803 in the optical axis direction (in the X-direction in FIG. 23B). In FIG. 23B, the illustration of the components other than the vibrating plate 601 and the friction member 701 is omitted from the linear driving apparatus 700. In accordance with a motion instruction issued from a microcomputer (not shown), the linear driving apparatus 700 moves over a corresponding distance. As a result, the lens holder 803 can be moved within a range from a left position indicated by the solid line in FIG. 23B to a right position 803' indicated by the broken line.

As described above, a range occupied by the vibrating plate 601, which becomes an obstacle in downsizing of the linear driving apparatus and the lens driving apparatus, is the sum of a motion distance L1 of the lens holder 803 and a size L2 of the vibrating plate 601 in the movement direction. Therefore, for the downsizing of the whole lens driving apparatus illustrated in FIG. 23B, the size L2 of the vibrating plate 601 in the movement direction needs to be reduced. In the lens driving apparatus that is downsized as illustrated in FIG. 23C, the achievement of reduction of the size L2 of the vibrating plate 601 in the movement direction becomes more important for the downsizing of the whole apparatus.

However, the related-art vibration wave motor has a configuration that is elongated in the movement direction, as illustrated in FIG. 20A to FIG. 20G. Therefore, the reduction of the size L2 in the movement direction has the following problem. If the whole apparatus is similarly reduced in size so as to simply reduce a total length, an area of the piezoelectric device becomes smaller to reduce deformation caused by a piezoelectric effect. Thus, a vibrational amplitude is reduced. Further, the entire size of the combination of the piezoelectric device and the vibrating plate is reduced to increase a resonant frequency. Thus, the vibrational amplitude is reduced.

As a result, the amplitude in the movement direction indicated by (ii) in FIG. 21A to FIG. 21D is reduced. Therefore, it is predicted that the thrust force is lowered. Further, as a result of reduction of the amplitude in a perpendicular direction indicated by (i) in FIG. 21A to FIG. 21D, the amplitude in the perpendicular direction (i) is insufficient for a surface roughness of a slider. Thus, it is also predicted that there arises a problem in that the thrust force cannot be obtained. Therefore, the reduction of the size L2 in the movement direction in the related-art vibration wave motor has a limit.

As described above, the size of the vibration wave motor in the movement direction needs to be reduced to downsize the driving apparatus. With the configuration of the related-art vibration wave motor, however, it is difficult to reduce the size of the vibration wave motor in the movement direction without losing the thrust force.

SUMMARY OF THE INVENTION

Thus, an object of the present invention is to reduce a size of a vibration wave motor in a movement direction without losing a thrust force so as to achieve downsizing of a driving apparatus by using the vibration wave motor.

In order to solve the problem described above, according to one embodiment of the present invention, there is provided a vibration wave motor, including a vibrating plate having rectangular surfaces; a piezoelectric device bonded onto the vibrating plate, and configured to vibrate at high frequency; and a projection provided on one of the vibrating plate and the piezoelectric device, in which a natural vibration mode, which has a resonant frequency equal to or adjacent to a resonant frequency of torsional vibration in a natural vibration mode under a state in which the vibrating plate, the piezoelectric device, and the projection are integrated, is a natural vibration mode of bending vibration in one of a direction parallel to and a direction orthogonal to a torsion center axis of the torsional vibration in the natural vibration mode; and the projection is provided at a position closer to an antinode than to a node, the node and the antinode being in the direction orthogonal to the torsion center axis of the torsional vibration in the natural vibration mode.

Further, according to one embodiment of the present invention, there is provided a driving apparatus, including a vibration wave motor, the vibration wave motor including a vibrating plate having a rectangular surface; a piezoelectric device bonded to the vibrating plate, and configured to vibrate at high frequency; a projection provided on one of the vibrating plate and the piezoelectric device, in which a natural vibration mode, which has a resonant frequency equal to or adjacent to a resonant frequency of torsional vibration in a natural vibration mode under a state in which the vibrating plate, the piezoelectric device, and the projection are integrated, is a natural vibration mode of bending vibration in one of a direction parallel to and a direction orthogonal to a torsion center axis of the torsional vibration in the natural vibration mode; the projection is provided at a position closer to an antinode than to a node, the node and the antinode being in the direction orthogonal to the torsion center axis of the torsional vibration in the natural vibration mode; and the direction orthogonal to the torsion center axis of the rectangular surface of the vibrating plate is used as a driving direction.

With the above-mentioned measures, the size of the vibration wave motor in the movement direction may be reduced without losing a thrust force so as to achieve downsizing of the driving apparatus by using the vibration wave motor.

Further features of the present invention will become apparent from the following description of exemplary embodiments with reference to the attached drawings.

BRIEF DESCRIPTION OF THE DRAWINGS

FIG. 1A, FIG. 1B, FIG. 1C, FIG. 1D, FIG. 1E, FIG. 1F, FIG. 1G and FIG. 1H are diagrams for illustrating a configuration of a vibration wave motor according to a first embodiment of the present invention.

FIG. 5A, FIG. 5B and FIG. 5C are diagrams for illustrating a configuration of a lens driving apparatus according to the first embodiment of the present invention.

FIG. 10A, FIG. 10B, FIG. 10C, FIG. 10D, FIG. 10E, FIG. 10F, FIG. 10G and FIG. 10H are diagrams for illustrating a configuration of a vibration wave motor according to a third embodiment of the present invention.

FIG. 11A, FIG. 11B, FIG. 11C and FIG. 11D are a graph and diagrams for illustrating speed control of the vibration wave motor according to the third embodiment of the present invention.

FIG. 12A, FIG. 12B, FIG. 12C and FIG. 12D are a graph and diagrams for illustrating the speed control of the vibration wave motor according to the third embodiment of the present invention.

FIG. 13A, FIG. 13B, FIG. 13C, FIG. 13D, FIG. 13E, FIG. 13F, FIG. 13G and FIG. 13H are diagrams for illustrating a configuration of a vibration wave motor according to a fourth embodiment of the present invention.

FIG. 17A, FIG. 17B, FIG. 17C, FIG. 17D, FIG. 17E, FIG. 17F, FIG. 17G and FIG. 17H are diagrams for illustrating another configuration of the vibration wave motor according to the fifth embodiment of the present invention.

FIG. 18A, FIG. 18B, FIG. 18C, FIG. 18D, FIG. 18E, FIG. 18F, FIG. 18G and FIG. 18H are diagrams for illustrating a configuration of a vibration wave motor according to a sixth embodiment of the present invention.

FIG. 19A, FIG. 19B and FIG. 19C are a graph and diagrams for illustrating speed control of the vibration wave motor according to the sixth embodiment of the present invention.

FIG. 20A, FIG. 20B, FIG. 20C, FIG. 20D, FIG. 20E, FIG. 20F and FIG. 20G are diagrams for illustrating a configuration of a related-art vibration wave motor.

FIG. 21A, FIG. 21B, FIG. 21C and FIG. 21D are a graph and diagrams for illustrating speed control of the related-art vibration wave motor.

DESCRIPTION OF THE EMBODIMENTS

Figure 2A:
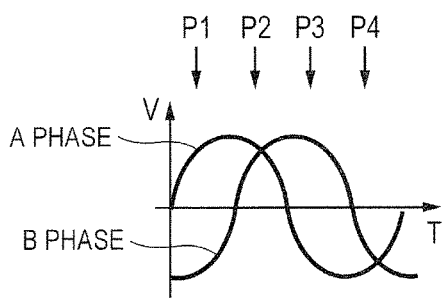
FIG. 2A, FIG. 2B, FIG. 2C and FIG. 2D are a graph and diagrams for illustrating speed control of the vibration wave motor according to the first embodiment of the present invention.

Now, embodiments according to the present invention are described in detail with reference to the accompanying drawings. Note that, in the drawings, the same reference symbols represent the same or corresponding parts.

First Embodiment

Now, a first embodiment for carrying out the present invention is described referring to the drawings. FIG. 1A to FIG. 1H are diagrams for illustrating a configuration of a vibration wave motor of the first embodiment according to the present invention. FIG. 1A is a plan view, FIG. 1B is a front view, FIG. 1C and FIG. 1D are side views, and FIG. 1E is a bottom view. In FIG. 1A to FIG. 1H, two projections 1a and 1b are provided on one rectangular surface of a vibrating plate 1. The projections 1a and 1b are integrally molded with the vibrating plate 1 through drawing or formed by bonding separate components on the vibrating plate 1.

A piezoelectric device 2 that vibrates at high frequency is bonded onto a surface of the vibrating plate 1 on a side opposite to the side where the projections 1a and 1b are provided. The piezoelectric device 2 includes two regions 2a and 2b obtained by polarization in the same direction. The region 2a is allocated to an A-phase, whereas the region 2b is allocated to a B-phase. An unpolarized region 2c is an electrode to be used as a ground that is conductive to a full-scale electrode on a back surface 2d of the piezoelectric device 2 through a side surface. The unpolarized region 2c can be located at any position as long as the region 2c is conductive to the full-scale electrode on the back surface 2d of the piezoelectric device 2 through the side surface, and therefore can be located at a position other than that illustrated in FIG. 1A. Coupling portions 1c and 1d are directly or indirectly coupled to a holding member (not shown) (described later) that moves in synchronization with the vibrating plate 1, and are respectively provided on shorter sides D2 of the rectangular surface of the vibrating plate 1.

The coupling portions 1c and 1d are provided to a portion where displacement due to vibration of the vibrating plate 1 and the piezoelectric device 2 is small and have sufficiently low rigidity, thereby having such a shape as not to hinder the vibration. Therefore, the coupling portions 1c and 1d scarcely affect the vibration of the vibrating plate 1 and the piezoelectric device 2. The vibrating plate 1, the piezoelectric device 2, and the projections 1a and 1b described above form a vibration wave motor 10.

In FIG. 1E, nodes and antinodes of each of torsional vibration in a secondary natural vibration mode in a direction of longer sides D1 and bending vibration in a primary natural vibration mode in the direction of the shorter sides D2 under a state in which the vibrating plate 1, the piezoelectric device 2, and the projections 1a and 1b are integrated are indicated by the alternate short and long dash lines. FIG. 1F is a view of the torsional vibration in the secondary natural vibration mode in the direction of the longer sides D1 as viewed in a direction indicated by the arrow d1, whereas FIG. 1G is a view of the torsional vibration in the secondary natural vibration mode in the direction of the longer sides D1 as viewed in a direction indicated by the arrow d2. Further, FIG. 1H is a view of the bending vibration in the primary natural vibration mode in the direction of the shorter sides D2 as viewed in the direction indicated by the arrow d2. In FIG. 1F, FIG. 1G, and FIG. 1H, the illustration of the projections 1a and 1b, the coupling portions 1c and 1d, and the piezoelectric device 2 is omitted.

As illustrated in FIG. 1E, a node Ma1 serves as a torsion center axis of the torsional vibration in the secondary natural vibration mode. An antinode Ma2 is parallel to the torsion center axis Ma1 of the torsional vibration in the secondary natural vibration mode. A node Mb1 is a node in a direction orthogonal to the torsion center axis Ma1 of the torsional vibration in the secondary natural vibration mode. Antinodes Mb2 and Mb3 are antinodes in the direction orthogonal to the torsion center axis Ma1 of the torsional vibration in the secondary natural vibration mode.

A node Na1 is a node of the bending vibration in the primary natural vibration mode. An antinode Na2 is an antinode of the bending vibration in the primary natural vibration mode. Further, by applying AC voltages from a power feeding unit (not shown) with a phase difference between the A-phase and the B-phase being freely changed, vibration can be caused.

Now, three characteristics relating to the natural vibration modes and the arrangement of the projections according to the first embodiment are described. A first characteristic lies in that a natural vibration mode having a resonant frequency that is equal to or adjacent to a resonant frequency of the torsional vibration in the secondary natural vibration mode is the primary natural vibration mode of the bending vibration in the direction orthogonal to the torsion center axis Ma1 of the torsional vibration in the secondary natural vibration mode. This characteristic is achieved by setting design values such as sizes in the direction of the longer sides D1 and the direction of the shorter sides D2, thicknesses of the vibrating plate 1 and the piezoelectric device 2, and rigidities of the vibrating plate 1 and the piezoelectric device 2 to appropriate values. A combination of appropriate values of the design values described above is not limited to one, and various combinations can be set.

A second characteristic lies in that the projections 1a and 1b are provided at positions closer to the antinode Mb2 than to the node Mb1 among the node Mb1 and the antinodes Mb2 and Mb3 in the direction orthogonal to the torsion center axis Ma1 of the torsional vibration in the secondary natural vibration mode, as illustrated in FIG. 1E.

A third characteristic lies in that the projections 1a and 1b are provided at positions closer to the antinode Na2 than to the node Na1 among the node Na1 and the antinode Na2 of the bending vibration in the primary natural vibration mode, as illustrated in FIG. 1E.

Figure 2C:
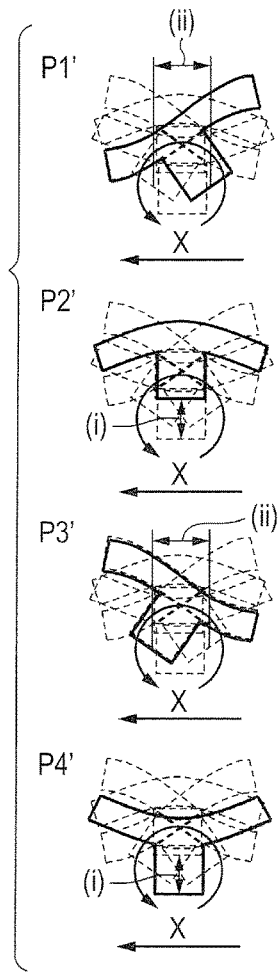
Figure 2B:
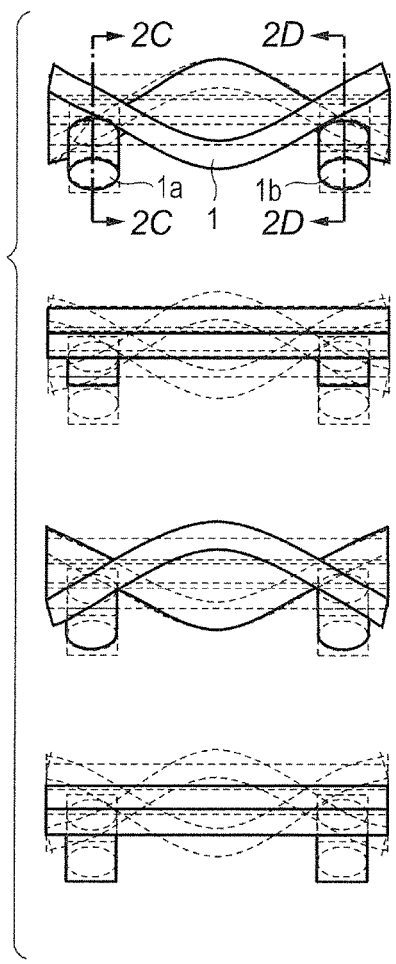
Figure 2D:
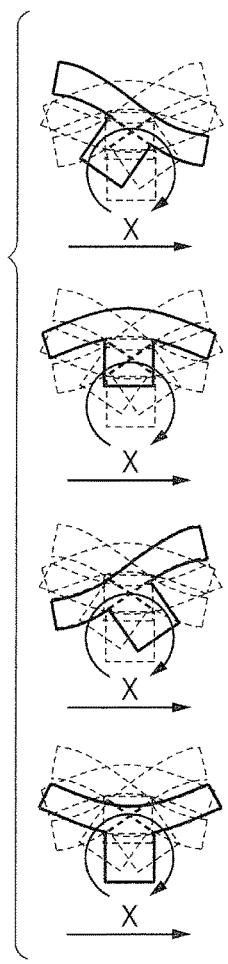

FIG. 2A to FIG. 2D are a graph and diagrams for illustrating a state of vibration when the AC voltages are applied with the B-phase being delayed by about +90° with respect to the A-phase, and correspond to FIG. 21A to FIG. 21D of the related-art example. FIG. 2A is a graph for showing changes in the AC voltages applied to the A-phase and the B-phase of the piezoelectric device, FIG. 2B is a front view corresponding to FIG. 1B, FIG. 2C is a sectional view taken along the line 2C-2C of FIG. 2B, and FIG. 2D is a sectional view taken along the line 2D-2D of FIG. 2B. P1' to P4' indicate changes in vibration with time. The illustration of the piezoelectric device 2 and the coupling portions 1c and 1d is omitted. With respect to electric changes P1 to P4 in the AC voltage shown in FIG. 2A, the mechanical changes P1' to P4' in the vibration illustrated in FIG. 2B, FIG. 2C, and FIG. 2D have a predetermined mechanical response delay time. An amplitude of the vibration is illustrated in an exaggerated manner.

After the predetermined mechanical response delay time from the time at which the voltages of the same sign are applied to the A-phase and the B-phase (P2 and P4 shown in FIG. 2A), the A-phase and the B-phase expand and contract in the same manner. Hence, the amplitude of the bending vibration in the primary natural vibration mode becomes maximum ((i) illustrated in FIG. 2C). On the other hand, after the predetermined mechanical response delay time from the time at which the voltages of different signs are applied to the A-phase and the B-phase (P1 and P3 shown in FIG. 2A), the A-phase and the B-phase expand and contract in the opposite directions. Hence, the amplitude of the torsional vibration in the secondary natural vibration mode becomes maximum ((ii) illustrated in FIG. 2C).

As a result, circular motion as illustrated in FIG. 2B to FIG. 2D occurs at a distal end of each of the projections. Therefore, a thrust force in the X-direction illustrated in FIG. 2B to FIG. 2D can be obtained. In a case where the AC voltages are applied with the B-phase being advanced by about +90° with respect to the A-phase, circular motion in the direction opposite to that illustrated in FIG. 2B to FIG. 2D occurs. Therefore, a thrust force in the opposite direction can be obtained.

Figure 3A:
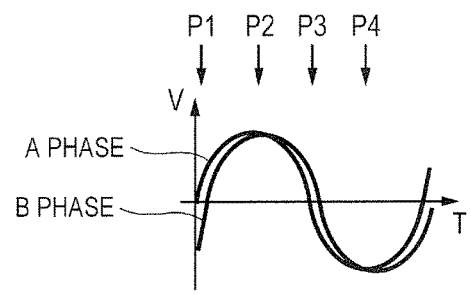
FIG. 3A, FIG. 3B, FIG. 3C and FIG. 3D are a graph and diagrams for illustrating the speed control of the vibration wave motor according to the first embodiment of the present invention.
Figure 3C:
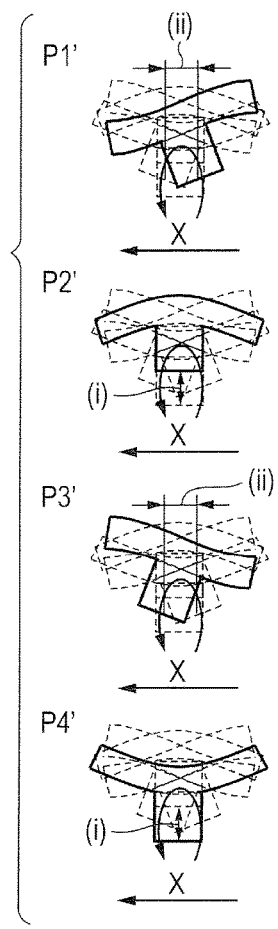
Figure 3B:
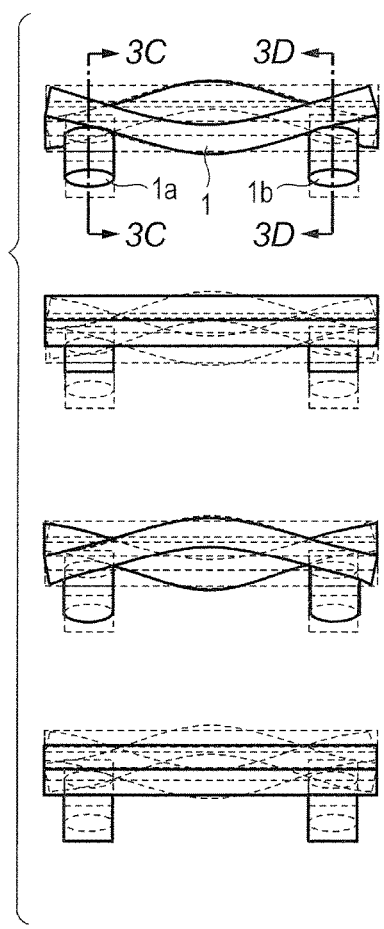
Figure 3D:
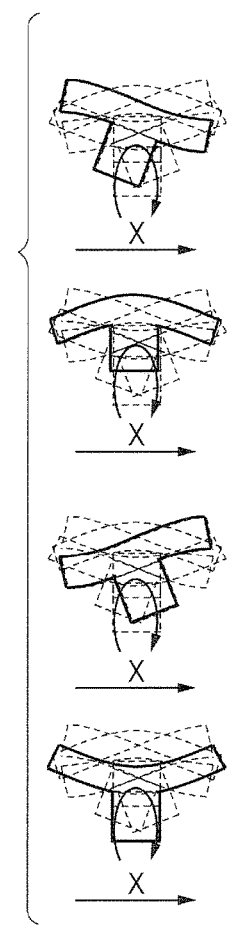

FIG. 3A to FIG. 3D are a graph and diagrams for illustrating a state of the vibration when the AC voltages are applied with little phase difference between the B-phase and the A-phase. FIG. 3A to FIG. 3D are equivalent to FIG. 2A to FIG. 2D. As illustrated, as compared with FIG. 2A to FIG. 2D, there is little time in which the voltages of different signs are applied to the A-phase and the B-phase. Therefore, the amplitude of the torsional vibration in the secondary natural vibration mode becomes extremely small ((ii) illustrated in FIG. 3C). As a result, oblong elliptic motion as illustrated in FIG. 3B to FIG. 3D occurs at the distal end of each of the projections. Therefore, the motion at an extremely low speed in the X-direction illustrated in FIG. 3C and FIG. 3D is enabled.

The vibration wave motor 10 of the first embodiment and the related-art vibration wave motor 600 are compared with each other referring to FIG. 2A to FIG. 2D and FIG. 21A to FIG. 21D. The related-art vibration wave motor 600 moves in the direction of the longer sides D1 (in the direction indicated by the arrow X in FIG. 21B to FIG. 21D). On the other hand, in the first embodiment, the vibration wave motor 10 can move in the direction of the shorter sides D2 (in the direction indicated by the arrow X in FIG. 2B to FIG. 2D). Therefore, a size of the vibration wave motor 10 in the movement direction can be reduced.

FIG. 1A to FIG. 1H and FIG. 20A to FIG. 20G are now compared with each other. Then, the piezoelectric device 2 of the first embodiment has the same area as that of the piezoelectric device of the related-art vibration wave motor. As a result, by setting the design values described above relating to the first characteristic to appropriate values, an amplitude (indicated by (i) and (ii) in FIG. 2A to FIG. 2D) that is approximately equal to that of the related-art vibration wave motor can be obtained. Therefore, an approximately equal thrust force can be obtained.

As described above, in the vibration wave motor 10 of the first embodiment, the area of the piezoelectric device is equal to that of the related-art vibration wave motor. Therefore, by setting the design values described above relating to the first characteristic to appropriate values, the vibration wave motor 10 can move in the direction of the shorter sides (in the direction indicated by the arrow X in FIG. 2B to FIG.

2D) that is the direction orthogonal to the torsion center axis. As a result, the size of the vibration wave motor in the movement direction can be reduced without losing the thrust force. By using the vibration wave motor, downsizing of a driving apparatus can be achieved.

In the first embodiment, the example where the natural vibration mode of the torsional vibration is the secondary natural vibration mode of the torsional vibration and the natural vibration mode of the bending vibration is the primary natural vibration mode of the bending vibration has been described. Even in other higher-order vibration modes, the same effects are obtained.

Further, in the first embodiment, the example where the two projections 1a and 1b are provided so as to sandwich the two nodes (Mb1) in the direction orthogonal to the torsion center axis of the torsional vibration in the natural vibration mode has been described. In a case where a higher-order vibration mode is used, however, the same effects are obtained by arranging arbitrary two projections so as not to sandwich the node in the direction orthogonal to the torsion center axis of the torsional vibration in the natural vibration mode or so as to sandwich an even number of nodes.

Figure 4A:
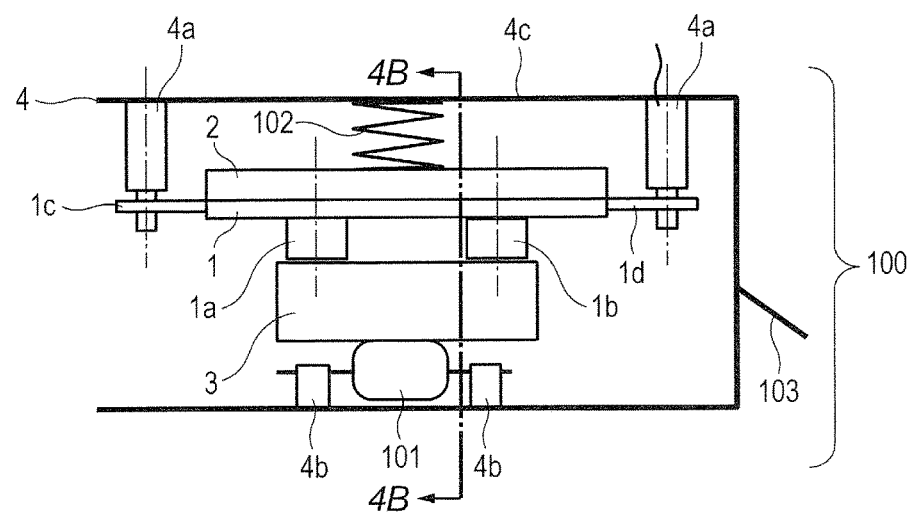
FIG. 4A and FIG. 4B are diagrams for illustrating a configuration of a linear driving apparatus according to the first embodiment of the present invention.
Figure 4B:
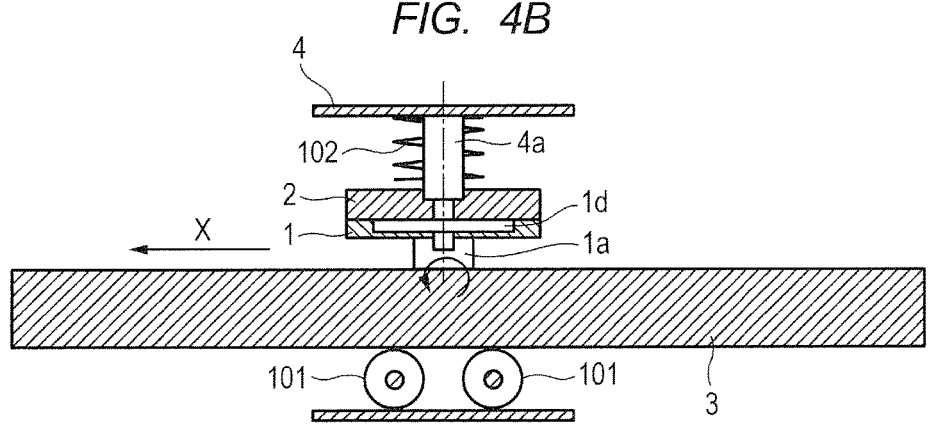
Figure 6A:
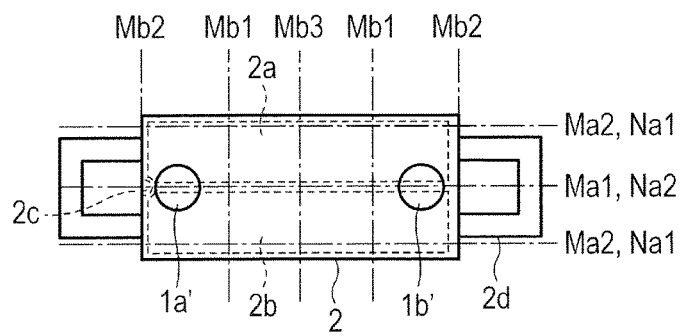
FIG. 6A, FIG. 6B, FIG. 6C, FIG. 6D and FIG. 6E are diagrams for illustrating another configuration of the vibration wave motor according to the first embodiment of the present invention.
Figure 6C:
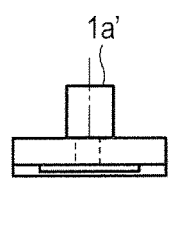
Figure 6B:
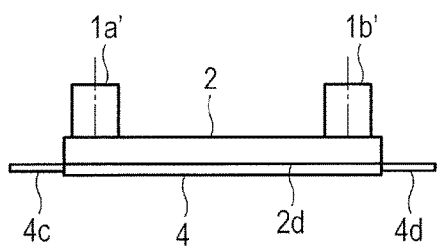
Figure 6D:
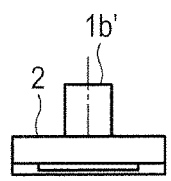
Figure 6E:
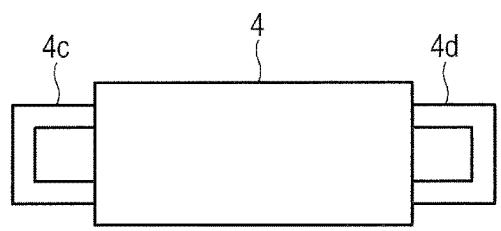
Figure 7A:
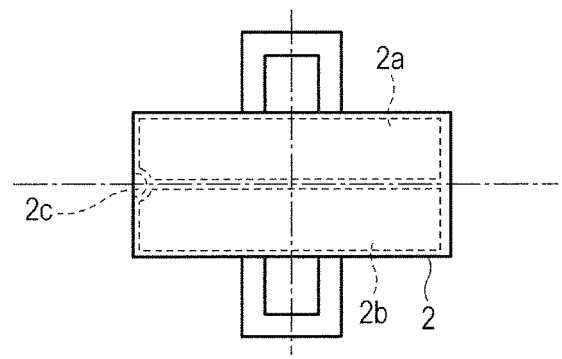
FIG. 7A, FIG. 7B, FIG. 7C, FIG. 7D and FIG. 7E are diagrams for illustrating another configuration of the vibration wave motor according to the first embodiment of the present invention.
Figure 7C:
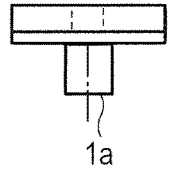
Figure 7B:
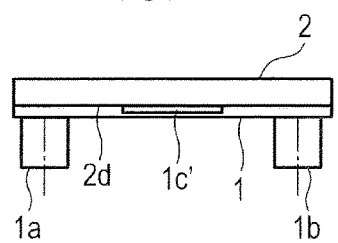
Figure 7D:
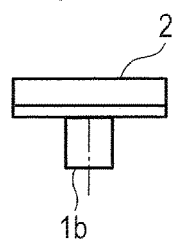
Figure 7E:
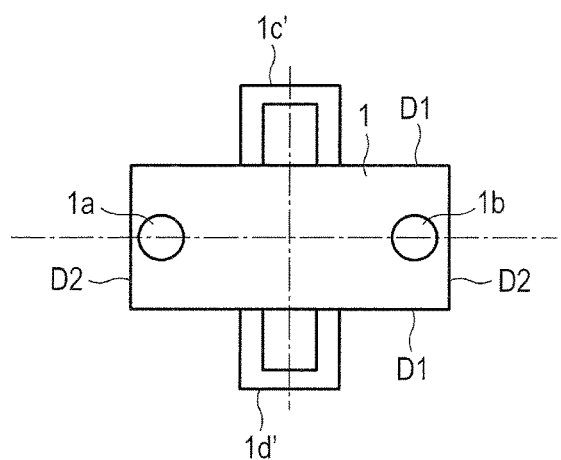

FIG. 4A and FIG. 4B are schematic diagrams of a linear driving apparatus 100 using the vibration wave motor 10 according to the first embodiment. FIG. 4A is a diagram as viewed in the movement direction of the vibration wave motor 10, and FIG. 4B is a sectional view taken along the line 4B-4B of FIG. 4A. As illustrated in FIG. 4A and FIG. 4B, in the vibration wave motor 10, a friction member 3, on which the vibrating plate 1 and the piezoelectric device 2 are provided, comes into contact with the vibrating plate 1. By high-frequency vibration of the vibrating plate 1, the vibrating plate 1 moves relatively. The vibrating plate 1 can move relative to the friction member 3 in the shorter-side direction that is the direction orthogonal to the torsion center axis of the rectangular surface of the vibrating plate 1.

The vibration wave motor 10 includes a holding member 4 configured to hold a vibrator (not shown) that moves in synchronization with the vibrating plate 1. The holding member 4 includes supporting portions 4a that support the vibrating plate 1 at the coupling portions 1c and 1d, and supporting portions 4b that pivotably support rollers 101 rotationally sliding on a back surface of the friction member 3 so that the rollers 101 freely rotate. A pressure spring 102 has a lower end acting on the piezoelectric device 2 and an upper end acting on the holding member 4 at a portion 4c. A drive transmitting portion 103 couples the holding member 4 and a driven body (not shown) (described later).

By a pressurizing force of the pressure spring 102, the projections 1a and 1b are brought into pressure-contact with the friction member 3. By the driving force generated by the circular motion as indicated by the arrows in FIG. 2A to FIG. 2D and FIG. 3A to FIG. 3D as described above, the holding member 4 obtains the thrust force in the X-direction illustrated in FIG. 4B. The rollers 101 are provided so as to ease a sliding resistance at the time of driving, and therefore may also be a mechanism such as rolling balls. If the sliding resistance is allowed, the holding member 4 may be directly slid with sliding friction. With the configuration described above, the linear driving apparatus 100 illustrated in FIG. 4A and FIG. 4B uses the shorter-side direction that is the direction orthogonal to the torsion center axis of the rectangular surface of the vibrating plate 1 as a driving direction for the vibration wave motor 10.

As described above, in the vibration wave motor 10 of the first embodiment, the area of the piezoelectric device is equal to that of the related-art vibration wave motor and by setting the design values described above relating to the first characteristic to appropriate values, the vibration wave motor 10 can move in the direction of the shorter sides that is the direction orthogonal to the torsion center axis. As a result, the size of the vibration wave motor in the movement direction can be reduced without losing the thrust force. By using the vibration wave motor 10, downsizing of the linear driving apparatus 100 can be achieved.

FIG. 5A to FIG. 5C are schematic views of a lens driving portion of a lens driving apparatus in which the linear driving apparatus 100 using the vibration wave motor of the first embodiment according to the present invention is mounted. FIG. 5A is a front view in an optical axis direction, and FIG. 5B and FIG. 5C are side views in which a frame body is partially broken away. FIG. 5C is an illustration of the lens driving apparatus that is further downsized as compared with that illustrated in FIG. 5B. In FIG. 5A to FIG. 5C, the lens driving apparatus includes the drive transmitting portion 103, the friction member 3, a frame body 201, a lens 202, a lens holder 203, and guiding shafts 204 and 205 that support the lens holder 203 to guide the lens holder 203 in the optical axis direction (in the X-direction illustrated in FIG. 5B). In FIG. 5B, the illustration of the members other than the vibrating plate 1 and the friction member 3 is omitted from the linear driving apparatus 100.

The vibrating plate 1 moves along the friction member 3 that is fixed to the frame body 201. In synchronization with the motion of the vibrating plate 1, the holding member 4 moves. The lens holder 203 is a driven body that is coupled to the holding member 4 through intermediation of the drive transmitting portion 103, and moves in synchronization with the holding member 4.

In accordance with a motion instruction issued from a microcomputer (not shown), the holding member 4 moves over a predetermined distance in the X-direction in FIG. 5A to FIG. 5C. In this manner, the lens holder 203 can be moved within a range from a position indicated by the solid line to a position 203' indicated by the broken line. With the configuration described above, the lens driving apparatus illustrated in FIG. 5A to FIG. 5C uses the shorter-side direction that is the direction orthogonal to the torsion center axis of the rectangular surface of the vibrating plate 1 as the driving direction for the vibration wave motor 10.

As described above, the vibration wave motor of the first embodiment includes the piezoelectric device having the area equal to that of the piezoelectric device of the related-art vibration wave motor. By setting the design values described above relating to the first characteristic to appropriate values, the vibration wave motor can move in the shorter-side direction that is the direction orthogonal to the torsion center axis. As a result, the size of the vibration wave motor in the movement direction is reduced without losing the thrust force. By using the vibration wave motor, the downsizing of the lens driving apparatus can be achieved.

In the first embodiment, the example where the vibrating plate 1 moves along the fixed friction member 3 has been described. Even with a configuration in which the friction member 3 moves along the fixed vibrating plate 1, the same functions can be realized though the downsizing effect is reduced.

Further, the example where the projections 1a and 1b are provided to the vibrating plate 1 has been described in the first embodiment. Even when projections 1a' and 1b' are bonded to the piezoelectric device 2 through adhesion as illustrated in FIG. 6A to FIG. 6E, the same effects are obtained.

In the first embodiment, the example where the coupling portions 1c and 1d are provided to the shorter sides D2 that are orthogonal to the torsion center axis of the vibrating plate 1 has been described. Even when coupling portions 1c' and 1d' are provided to the longer sides D1 parallel to the torsion center axis as illustrated in FIG. 7A to FIG. 7E, the same functions can be realized though the downsizing effect is reduced. Further, the same functions can be realized by providing the coupling portions 1c' and 1d' to any portion of the vibrating plate 1 and the piezoelectric device 2 as long as a condition that the vibration of the vibrating plate 1 and the piezoelectric device 2 is scarcely affected is satisfied.

Second Embodiment

Now, a second embodiment for carrying out the present invention is described referring to the drawings. FIG. 8A to FIG. 8H are diagrams for illustrating a configuration of a vibration wave motor 20 according to the second embodiment, and are equivalent to FIG. 1A to FIG. 1H for illustrating the first embodiment. As illustrated in FIG. 8A to FIG. 8H, the vibration wave motor 20 includes a vibrating plate 11, a piezoelectric device 12, and coupling portions 11c and 11d, and therefore has the same configuration as that of the first embodiment illustrated in FIG. 1A to FIG. 1H.

The piezoelectric device 12 includes regions obtained by polarization, similar to those illustrated in FIG. 1A to FIG. 1H of the first embodiment. The first embodiment and the second embodiment differ from each other in the following point. Specifically, the two projections 1a and 1b are provided in the first embodiment, whereas a single projection 11a is provided in the second embodiment. The vibrating plate 11, the piezoelectric device 12, and the projection 11a described above form the vibration wave motor 20. By applying the AC voltages from the power feeding unit (not shown) with the phase difference between the A-phase and the B-phase being freely changed, the vibration can be caused.

Figure 8A:
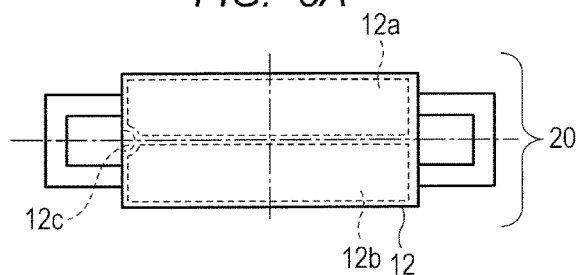
FIG. 8A, FIG. 8B, FIG. 8C, FIG. 8D, FIG. 8E, FIG. 8F, FIG. 8G and FIG. 8H are diagrams for illustrating a configuration of a vibration wave motor according to a second embodiment of the present invention.
Figure 8C:
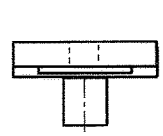
Figure 8B:
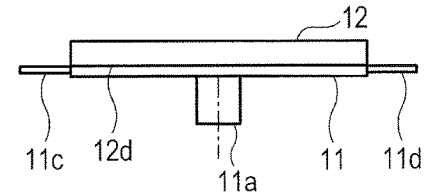
Figure 8D:
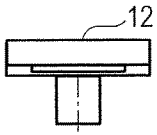
Figure 8H:
Figure 8G:
Figure 8E:
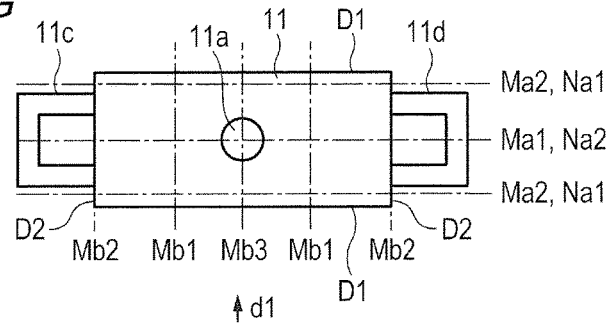
Figure 8F:

In FIG. 8E, nodes and antinodes of each of the torsional vibration in the secondary natural vibration mode in the direction of the longer sides D1 and the bending vibration in the primary natural vibration mode in the direction of the shorter sides D2 under a state in which the vibrating plate 11, the piezoelectric device 12, and the projection 11a are integrated, are indicated by the alternate short and long dash lines. The nodes and the antinodes are similar to those of the first embodiment illustrated in FIG. 1A to FIG. 1H.

Now, three characteristics relating to the natural vibration modes and the arrangement of the projection according to the second embodiment are described.

A first characteristic lies in that a resonant frequency of the torsional vibration in the secondary natural vibration mode and a resonant frequency of the bending vibration in the primary natural vibration mode in the direction orthogonal to the torsion center axis Ma1 are identical to or adjacent to each other. This characteristic is the same as that in the first embodiment.

A second characteristic lies in that the projection 11a is provided at a position closer to the antinode Mb3 than to the node Mb1 among the node Mb1 and the antinodes Mb2 and Mb3 in the direction orthogonal to the torsion center axis Ma1 of the torsional vibration in the secondary natural vibration mode, as illustrated in FIG. 8E.

A third characteristic lies in that the projection 11a is provided at a position closer to the antinode Na2 than to the node Na1 among the node Na1 and the antinode Na2 of the bending vibration in the primary natural vibration mode, as illustrated in FIG. 8E.

Figure 9A:
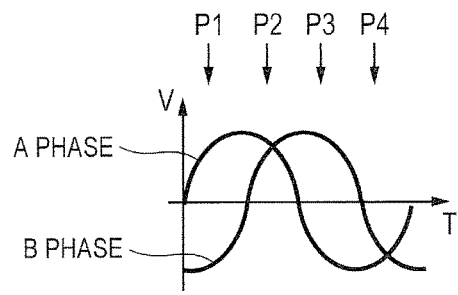
FIG. 9A, FIG. 9B and FIG. 9C are a graph and diagrams for illustrating speed control of the vibration wave motor according to the second embodiment of the present invention.
Figure 9C:
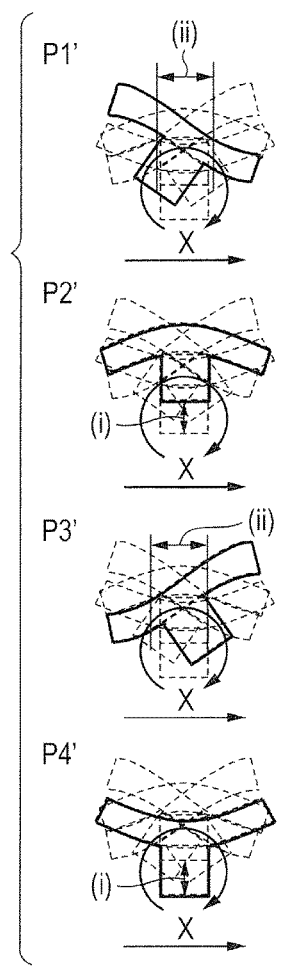
Figure 9B:
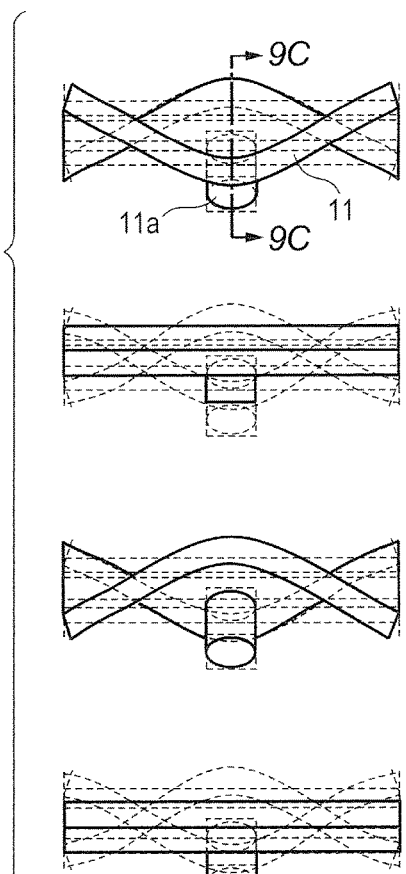
Figure 10F:
Figure 13F:

FIG. 9A to FIG. 9C are a graph and diagrams for illustrating a state of vibration when the AC voltages are applied with the B-phase being delayed by about +90° with respect to the A-phase, and correspond to FIG. 2A to FIG. 2D of the first embodiment. FIG. 9A is a graph for showing changes in the AC voltages applied to the A-phase and the B-phase of the piezoelectric device, FIG. 9B is a front view corresponding to FIG. 8B, and FIG. 9C is a sectional view taken along the line 9C-9C of FIG. 9B. P1' to P4' indicate changes in vibration with time. The illustration of the piezoelectric device 12 and the coupling portions 11c and 11d is omitted. With respect to electric changes P1 to P4 in the AC voltage shown in FIG. 9A, the mechanical changes P1' to P4' in the vibration illustrated in FIG. 9B and FIG. 9C have a predetermined mechanical response delay time. An amplitude of the vibration is illustrated in an exaggerated manner.

By applying the AC voltages with the B-phase being delayed by about +90° with respect to the A-phase, circular motion as illustrated in FIG. 9A to FIG. 9C occurs at a distal end of the projection 11a. As a result, the thrust force can be obtained in the X-direction illustrated in FIG. 9C, which is the same as in the first embodiment. Further, when the AC voltages are applied with the B-phase being advanced by about +90° with respect to the A-phase, circular motion in a direction opposite to that of the circular motion illustrated in FIG. 9A to FIG. 9C occurs. As a result, the thrust force in the opposite direction can be obtained, which is also the same as in the first embodiment. Further, by applying the AC voltages with little phase difference between the B-phase and the A-phase, oblong elliptic motion as illustrated in FIG. 3A to FIG. 3D occurs at the distal end of the projection 11a to enable the motion at an extremely low speed, which is also the same as in the first embodiment.

As described above, in the vibration wave motor 20 of the second embodiment, the area of the piezoelectric device is equal to that of the related-art vibration wave motor, and by setting the design values described above relating to the first characteristic to appropriate values, the vibration wave motor 20 can move in the direction of the shorter sides (in the direction indicated by the arrow X in FIG. 9A to FIG. 9C) that is the direction orthogonal to the torsion center axis. As a result, the size of the vibration wave motor in the movement direction can be reduced without losing the thrust force. By using the vibration wave motor, downsizing of a driving apparatus can be achieved.

With the configuration illustrated in FIG. 4A and FIG. 4B and the configuration illustrated in FIG. 5A to FIG. 5C of the first embodiment by using the vibration wave motor of the second embodiment, the same effects can be obtained in the linear driving apparatus and the lens driving apparatus.

Similarly to the first embodiment, the vibrating plate 11 may be fixed. Further, the projection 11a may be bonded to the piezoelectric device 12 through adhesion. Further, the coupling portions 11c and 11d may be provided to the longer sides D1 parallel to the torsion center axis of the vibrating plate 11. Further, the same effects can be realized by providing the coupling portions 11c and 11d to any portion of the vibrating plate 11 and the piezoelectric device 12 as long as a condition that the vibration of the vibrating plate 11 and the piezoelectric device 12 is scarcely affected is satisfied, which is also the same as in the first embodiment.

In the second embodiment, the example where the natural vibration mode of the torsional vibration is the secondary natural vibration mode of the torsional vibration and the natural vibration mode of the bending vibration is the primary natural vibration mode of the bending vibration has been described. However, the same effects are obtained even in other higher-order vibration modes, which is also the same as in the first embodiment.

Third Embodiment

Now, a third embodiment for carrying out the present invention is described. FIG. 10A to FIG. 10H are diagrams for illustrating a configuration of a vibration wave motor 30 according to the third embodiment, and are equivalent to FIG. 1A to FIG. 1H of the first embodiment. As illustrated in FIG. 10A to FIG. 10H, the vibration wave motor 30 includes a vibrating plate 21, a piezoelectric device 22, and coupling portions 21c and 21d, and therefore has the same configuration as that of the first embodiment illustrated in FIG. 1A to FIG. 1H.

The piezoelectric device 22 includes regions obtained by polarization, similar to those illustrated in FIG. 1A to FIG. 1H of the first embodiment. The vibrating plate 21, the piezoelectric device 22, and projections 21a and 21b form the vibration wave motor 30. By applying the AC voltages from the power feeding unit (not shown) with the phase difference between the A-phase and the B-phase being freely changed, the vibration can be caused.

In FIG. 10E, nodes and antinodes of each of the torsional vibration in the secondary natural vibration mode in the direction of the longer sides D1 and the bending vibration in the primary natural vibration mode in the direction of the shorter sides D2 under a state in which the vibrating plate 21, the piezoelectric device 22, and the projections 21a and 21b are integrated, are indicated by the alternate short and long dash lines. The nodes and the antinodes are similar to those of the first embodiment illustrated in FIG. 1A to FIG. 1H.

Now, three characteristics relating to the natural vibration modes and the arrangement of the projections according to the third embodiment are described. A first characteristic lies in that a resonant frequency of the torsional vibration in the secondary natural vibration mode and a resonant frequency of the bending vibration in the primary natural vibration mode in the direction orthogonal to the torsion center axis Ma1 are identical to or adjacent to each other. This characteristic is the same as that in the first embodiment.

A second characteristic lies in that the projections 21a and 21b are provided at positions closer to the antinode Mb3 than to the node Mb1 among the node Mb1 and the antinodes Mb2 and Mb3 in the direction orthogonal to the torsion center axis Ma1 of the torsional vibration in the secondary natural vibration mode, as illustrated in FIG. 10E.

A third characteristic lies in that the projections 21a and 21b are provided at positions closer to the node Na1 than to the antinode Na2 among the node Na1 and the antinode Na2 of the bending vibration in the primary natural vibration mode, as illustrated in FIG. 10E.

FIG. 11A to FIG. 11D are a graph and diagrams for illustrating a state of vibration when the AC voltages are applied with the B-phase being delayed by about +90° with respect to the A-phase, and correspond to FIG. 2A to FIG. 2D of the first embodiment. FIG. 11A is a graph for showing changes in the AC voltages applied to the A-phase and the B-phase of the piezoelectric device, FIG. 11C is a front view corresponding to FIG. 10B, FIG. 11B is a sectional view taken along the line 11B-11B of FIG. 11C, and FIG. 11D is a rear view. P1' to P4' indicate changes in vibration with time. The illustration of the piezoelectric device 22 and the coupling portions 21c and 21d is omitted. With respect to electric changes P1 to P4 in the AC voltage shown in FIG. 11A, the mechanical changes P1' to P4' in the vibration illustrated in FIG. 11B, FIG. 11C, and FIG. 11D have a predetermined mechanical response delay time. An amplitude of the vibration is illustrated in an exaggerated manner.

At the time at which the voltages of the same sign are applied to the A-phase and the B-phase (P2 and P4 shown in FIG. 11A), the A-phase and the B-phase expand and contract in the same manner. Hence, the amplitude of the bending vibration in the primary natural vibration mode becomes maximum ((ii) illustrated in FIG. 11B). On the other hand, at the time at which the voltages of different signs are applied to the A-phase and the B-phase (P1 and P3 shown in FIG. 11A), the A-phase and the B-phase expand and contract in the opposite directions. Hence, the amplitude of the torsional vibration in the secondary natural vibration mode becomes maximum ((i) illustrated in FIG. 11B). As a result, circular motion as illustrated in FIG. 11B occurs at a distal end of each of the projections 21a and 21b. Therefore, the thrust force can be obtained in the X-direction illustrated in FIG. 11A to FIG. 11D. Further, when the AC voltages are applied with the B-phase being advanced by about +90° with respect to the A-phase, the circular motion in the direction opposite to that illustrated in FIG. 11A to FIG. 11D occurs. Therefore, the thrust force in the opposite direction can be obtained.

FIG. 12A to FIG. 12D are a graph and diagrams for illustrating a state of vibration when the AC voltages are applied with the B-phase being delayed by about +180° with respect to the A-phase. FIG. 12A to FIG. 12D are equivalent to FIG. 11A to FIG. 11D. As illustrated in FIG. 12A to FIG. 12D, there is little time in which the voltages of the same sign are applied to the A-phase and the B-phase, as compared with FIG. 11A to FIG. 11D. Therefore, the amplitude of the bending vibration in the primary natural vibration mode becomes extremely small (indicated by (ii) in FIG. 12B). As a result, the oblong elliptic motion as illustrated in FIG. 12B occurs at the distal end of each of the projections 21a and 21b. Therefore, the motion at an extremely low speed in the X-direction illustrated in FIG. 12B is enabled.

As described above, in the vibration wave motor 30 of the third embodiment, the area of the piezoelectric device is equal to that of the related-art vibration wave motor. Therefore, by setting the design values described above relating to the first characteristic to appropriate values, the vibration wave motor 30 can move in the direction of the shorter sides (in the direction indicated by the arrow X in FIG. 11A to FIG. 11D) that is the direction orthogonal to the torsion center axis. As a result, the size of the vibration wave motor in the movement direction can be reduced without losing the thrust force. By using the vibration wave motor, downsizing of a driving apparatus can be achieved.

With the configuration illustrated in FIG. 4A and FIG. 4B and the configuration illustrated in FIG. 5A to FIG. 5C of the first embodiment by using the vibration wave motor 30 of the third embodiment, the same effects can be obtained in the linear driving apparatus and the lens driving apparatus.

Similarly to the first embodiment, the vibrating plate 21 may be fixed, the projections may be bonded to the piezoelectric device 22 through adhesion, and the coupling portions 21c and 21d may be provided to the longer sides D1 parallel to the torsion center axis of the vibrating plate 21. Further, the same effects can be realized by providing the coupling portions 21c and 21d to any portion of the vibrating plate 21 and the piezoelectric device 22 as long as a condition that the vibration of the vibrating plate 21 and the piezoelectric device 22 is scarcely affected is satisfied, which is also the same as in the first embodiment.

In the third embodiment, the example where the natural vibration mode of the torsional vibration is the secondary natural vibration mode of the torsional vibration and the natural vibration mode of the bending vibration is the primary natural vibration mode of the bending vibration has been described. However, the same effects are obtained even in other higher-order vibration modes, which is also the same as in the first embodiment.

Fourth Embodiment

Now, a fourth embodiment for carrying out the present invention is described. FIG. 13A to FIG. 13H are diagrams for illustrating a configuration of a vibration wave motor 40 according to the fourth embodiment, and are equivalent to FIG. 10A to FIG. 10H of the third embodiment. As illustrated in FIG. 13A to FIG. 13H, the vibration wave motor 40 includes a vibrating plate 31, a piezoelectric device 32, and coupling portions 31c and 31d, and therefore has the same configuration as that of the third embodiment illustrated in FIG. 10A to FIG. 10H.

The piezoelectric device 32 includes regions obtained by polarization, similar to those illustrated in FIG. 10A to FIG. 10H of the third embodiment. The third embodiment and the fourth embodiment differ from each other in the following point. Specifically, the two projections 21a and 21b are provided in the third embodiment, whereas four projections 31a1, 31a2, 31b1, and 31b2 are provided in the fourth embodiment. The vibrating plate 31, the piezoelectric device 32, and the projections 31a1, 31a2, 31b1, and 31b2 described above form the vibration wave motor 40. By applying the AC voltages from the power feeding unit (not shown) with the phase difference between the A-phase and the B-phase being freely changed, the vibration can be caused.

In FIG. 13E, nodes and antinodes of each of the torsional vibration in the secondary natural vibration mode in the direction of the longer sides D1 and the bending vibration in the primary natural vibration mode in the direction of the shorter sides D2 under a state in which the vibrating plate 31, the piezoelectric device 32, and the projections 31a1, 31a2, 31b1, and 31b2 are integrated, are indicated by the alternate short and long dash lines. The nodes and the antinodes are similar to those of the first embodiment illustrated in FIG. 1A to FIG. 1H.

Now, three characteristics relating to the natural vibration modes and the arrangement of the projections according to the fourth embodiment are described. A first characteristic lies in that a resonant frequency of the torsional vibration in the secondary natural vibration mode and a resonant frequency of the bending vibration in the primary natural vibration mode in the direction orthogonal to the torsion center axis Ma1 are identical to or adjacent to each other. This characteristic is the same as that in the first embodiment.

A second characteristic lies in that the projections 31a1 to 31b2 are provided at positions closer to the antinode Mb2 than to the node Mb1 among the node Mb1 and the antinodes Mb2 and Mb3 in the direction orthogonal to the torsion center axis Ma1 of the torsional vibration in the secondary natural vibration mode, as illustrated in FIG. 13E.

A third characteristic lies in that the projections 31a1 to 31b2 are provided at positions closer to the node Na1 than to the antinode Na2 among the node Na1 and the antinode Na2 of the bending vibration in the primary natural vibration mode, as illustrated in FIG. 13E.

Figure 14A:
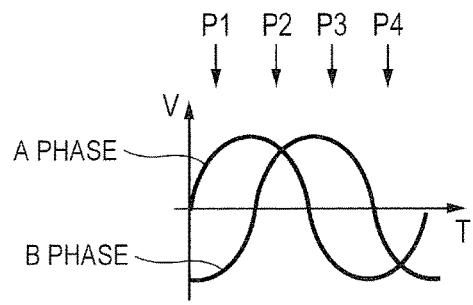
FIG. 14A, FIG. 14B, FIG. 14C and FIG. 14D are a graph and diagrams for illustrating speed control of the vibration wave motor according to the fourth embodiment of the present invention.
Figure 14C:
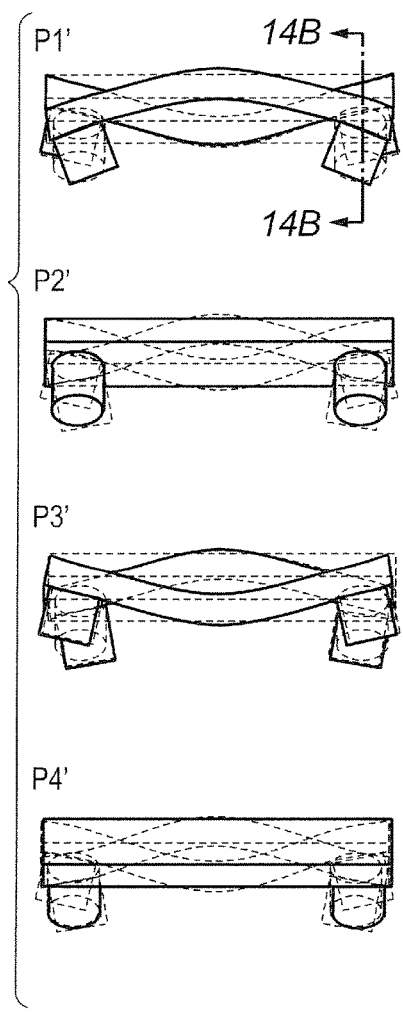
Figure 14B:
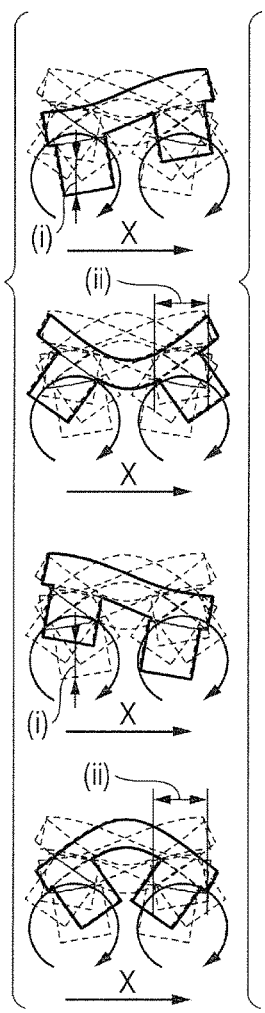
Figure 14D:
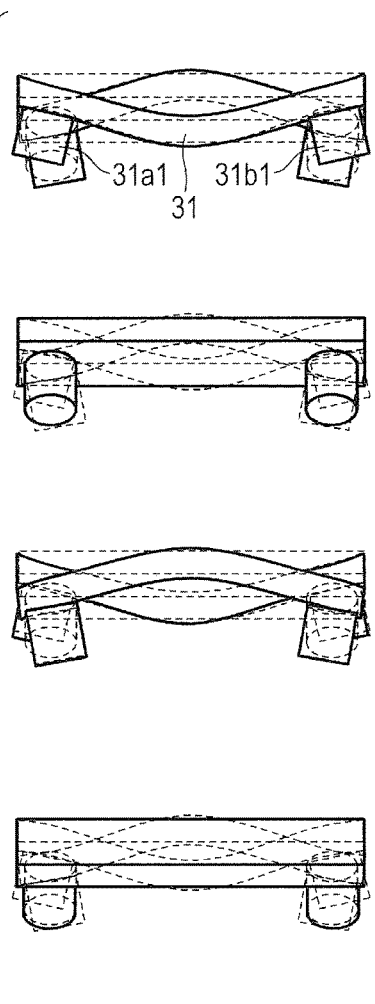

FIG. 14A to FIG. 14D are a graph and diagrams for illustrating a state of vibration when the AC voltages are applied with the B-phase being delayed by about +90° with respect to the A-phase, and correspond to FIG. 11A to FIG. 11D of the third embodiment. FIG. 14A is a graph for showing changes in the AC voltages applied to the A-phase and the B-phase of the piezoelectric device, FIG. 14C is a front view corresponding to FIG. 13B, FIG. 14B is a sectional view taken along the line 14B-14B of FIG. 14C, and FIG. 14D is a rear view.

P1' to P4' indicate changes in vibration with time. The illustration of the piezoelectric device 32 and the coupling portions 31c and 31d is omitted. With respect to electric changes P1 to P4 in the AC voltage shown in FIG. 14A, the mechanical changes P1' to P4' in the vibration illustrated in FIG. 14B, FIG. 14C, and FIG. 14D have a predetermined mechanical response delay time. An amplitude of the vibration is illustrated in an exaggerated manner.

By applying the AC voltages with the B-phase being delayed by about +90° with respect to the A-phase, circular motion as illustrated in FIG. 14A to FIG. 14D occurs at a distal end of each of the projections 31a1 to 31b2. As a result, the thrust force can be obtained in the X-direction illustrated in FIG. 14A to FIG. 14D, which is the same as in the third embodiment. Further, when the AC voltages are applied with the B-phase being advanced by about +90° with respect to the A-phase, circular motion in a direction opposite to that of the circular motion illustrated in FIG. 14A to FIG. 14D occurs. As a result, the thrust force in the opposite direction can be obtained, which is also the same as in the third embodiment. Further, by applying the AC voltages with the B-phase being delayed by about +180° with respect to the A-phase, oblong elliptic motion as illustrated in FIG. 12A to FIG. 12D occurs at the distal end of each of the projections 31a1 to 31b2 to enable the motion at an extremely low speed, which is also the same as in the third embodiment.

As described above, in the vibration wave motor 40 of the fourth embodiment, the area of the piezoelectric device is equal to that of the related-art vibration wave motor, and by setting the design values described above relating to the first characteristic to appropriate values, the vibration wave motor 40 can move in the direction of the shorter sides (in the direction indicated by the arrow X in FIG. 14A to FIG. 14D) that is the direction orthogonal to the torsion center axis. As a result, the size of the vibration wave motor in the movement direction can be reduced without losing the thrust force. By using the vibration wave motor, downsizing of a driving apparatus can be achieved.

With the configuration illustrated in FIG. 4A and FIG. 4B and the configuration illustrated in FIG. 5A to FIG. 5C of the first embodiment by using the vibration wave motor 40 of the fourth embodiment, the same effects can be obtained in the linear driving apparatus and the lens driving apparatus.

Similarly to the first embodiment, the vibrating plate 31 may be fixed, the projections 31a1 to 31b2 may be bonded to the piezoelectric device 32 through adhesion, and the coupling portions 31c and 31d may be provided to the longer sides D1 parallel to the torsion center axis of the vibrating plate 31. Further, the same effects can be realized by providing the coupling portions to any portion of the vibrating plate 31 and the piezoelectric device 32 as long as a condition that the vibration of the vibrating plate 31 and the piezoelectric device 32 is scarcely affected is satisfied, which is also the same as in the first embodiment.

In the fourth embodiment, the example where the natural vibration mode of the torsional vibration is the secondary natural vibration mode of the torsional vibration and the natural vibration mode of the bending vibration is the primary natural vibration mode of the bending vibration has been described. However, the same effects are obtained even in other higher-order vibration modes, which is also the same as in the first embodiment.

Further, in the fourth embodiment, at least two, in this case, the four projections 31a1, 31a2, 31b1, and 31b2 are provided. Each of a set of the projections 31a1 and 31b1 and a set of the projections 31a2 and 31b2 sandwiches two nodes (Mb1) in the direction orthogonal to the torsion center axis of the torsional vibration in the natural vibration mode. In addition, each of a set of the projections 31a1 and 31a2 and a set of the projections 31b1 and 31b2 does not sandwich two nodes in the direction orthogonal to the torsion center axis of the torsional vibration in the natural vibration mode. When a higher-order vibration mode is used, the same effects are obtained by arranging the projections so that arbitrary two projections do not sandwich the nodes in the direction orthogonal to the torsion center axis of the torsional vibration in the natural vibration mode or sandwich an even number of the nodes.

Fifth Embodiment

Now, a fifth embodiment for carrying out the present invention is described.

Figure 15A:
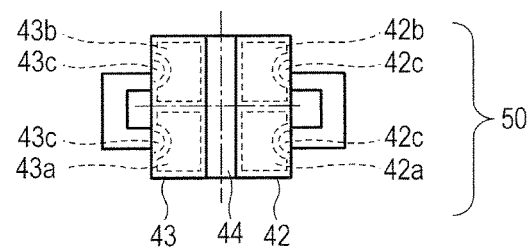
FIG. 15A, FIG. 15B, FIG. 15C, FIG. 15D, FIG. 15E, FIG. 15F, FIG. 15G and FIG. 15H are diagrams for illustrating a configuration of a vibration wave motor according to a fifth embodiment of the present invention.
Figure 15C:
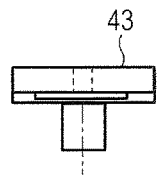
Figure 15B:
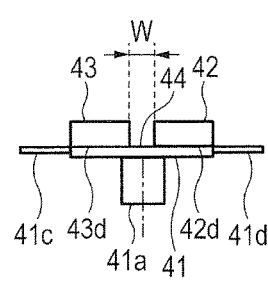
Figure 15D:
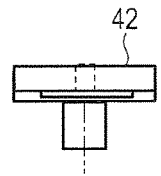
Figure 15E:

FIG. 15A to FIG. 15H are diagrams for illustrating a configuration of a vibration wave motor 50. FIG. 15A is a plan view, FIG. 15B is a front view, FIG. 15C and FIG. 15D are side views, and FIG. 15E is a bottom view. As illustrated in FIG. 15A to FIG. 15H, the vibration wave motor 50 includes a vibrating plate 41 having a rectangular surface and one projection 41a provided on the rectangular surface of the vibrating plate 41. The projection 41a may be integrally molded with the vibrating plate 41 through drawing or may be formed by bonding a separate component on the vibrating plate 41.

Piezoelectric devices 42 and 43 that vibrate at high frequency are bonded onto a surface of the vibrating plate 41 on a side opposite to the side where the projection 41a is provided. The piezoelectric device 42 and 43 include four regions 42a, 42b, 43a, and 43b obtained by polarization in the same direction. The regions 42a and 43a are allocated to the A-phase, whereas the regions 42b and 43b are allocated to the B-phase. Unpolarized regions 42c and 43c are electrodes to be used as a ground that are conductive to full-scale electrodes on back surfaces 42d and 43d of the piezoelectric devices 42 and 43 through side surfaces. The unpolarized regions 42c and 43c can be located at any position as long as the regions 42c and 43c are conductive to the full-scale electrodes on the back surface 42d of the piezoelectric device 42 and the back surface 43d of the piezoelectric device 43 through the side surface.

As illustrated in FIG. 15B, coupling portions 41c and 41d provided to the vibrating plate 41 are directly or indirectly coupled to a holding member (not shown) similar to that of the first embodiment, which moves in synchronization with the vibrating plate 41. The coupling portions 41c and 41d are provided to a portion where displacement due to vibration of the vibrating plate 41 and the piezoelectric devices 42 and 43 is small and have sufficiently low rigidity, thereby having such a shape as not to hinder the vibration. Therefore, the coupling portions 41c and 41d scarcely affect the vibration of the vibrating plate 41 and the piezoelectric devices 42 and 43. The vibrating plate 41, the piezoelectric devices 42 and 43, and the projection 41a described above form the vibration wave motor 50.

Figures 15G, 15H:
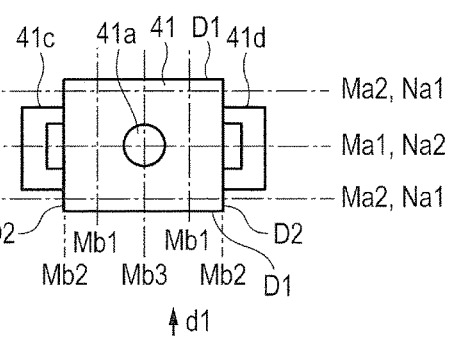
Figure 15F:

In FIG. 15E, nodes and antinodes of each of the torsional vibration in the secondary natural vibration mode in the direction of the sides D1 and the bending vibration in the primary natural vibration mode in the direction of the sides D2 under a state in which the vibrating plate 41, the piezoelectric devices 42 and 43, and the projection 41a are integrated, are indicated by the alternate short and long dash lines. FIG. 15F is a view of the torsional vibration in the secondary natural vibration mode in the direction of the sides D1 as viewed in a direction indicated by the arrow d1, whereas FIG. 15G is a view of the torsional vibration in the secondary natural vibration mode in the direction of the sides D1 as viewed in a direction indicated by the arrow d2. Further, FIG. 15H is a view of the bending vibration in the primary natural vibration mode in the direction of the sides D2 as viewed in the direction indicated by the arrow d2.

In FIG. 15F, FIG. 15G, and FIG. 15H, the illustration of the projection 41a, the coupling portions 41c and 41d and the piezoelectric devices 42 and 43 is omitted. As illustrated in FIG. 15E, a node Ma1 serves as a torsion center axis of the torsional vibration in the secondary natural vibration mode. An antinode Mat is parallel to the torsion center axis Ma1 of the torsional vibration in the secondary natural vibration mode. A node Mb1 is a node in a direction orthogonal to the torsion center axis Ma1 of the torsional vibration in the secondary natural vibration mode. An antinode Mb2 is an antinode in the direction orthogonal to the torsion center axis Ma1 of the torsional vibration in the secondary natural vibration mode. A node Na1 is a node of the bending vibration in the primary natural vibration mode. An antinode Na2 is an antinode of the bending vibration in the primary natural vibration mode. Further, by applying the AC voltages from the power feeding unit (not shown) with the phase difference between the A-phase and the B-phase being freely changed, vibration can be caused.

Now, three characteristics relating to the natural vibration modes and the arrangement of the projection according to the fifth embodiment are described.

A first characteristic lies in that a natural vibration mode having a resonant frequency that is equal to or adjacent to a resonant frequency of the torsional vibration in the secondary natural vibration mode is the primary natural vibration mode of the bending vibration in the direction orthogonal to the torsion center axis Ma1 of the torsional vibration in the secondary natural vibration mode. This characteristic is achieved by setting design values such as sizes in the direction of the sides D1 and the direction of the sides D2, a width W of a portion 44 inside the vibrating plate 41, which is not covered with the piezoelectric devices 42 and 43, thicknesses of the vibrating plate 41 and the piezoelectric devices 42 and 43, and rigidities of the vibrating plate 41 and the piezoelectric devices 42 and 43 to appropriate values. A combination of appropriate values of the design values described above is not limited to one, and various combinations can be set.

Now, the fifth embodiment and the first embodiment are compared with each other for a size of the side D1. Then, the size of each of the sides D1 of the fifth embodiment is smaller. If the size of the side D1 is simply reduced, the resonant frequency of the torsional vibration in the secondary natural vibration mode in the direction of the sides D1 increases, failing to achieve the first characteristic described above. In the fifth embodiment, however, the portion 44 that is not covered with the piezoelectric devices 42 and 43 is provided inside the vibrating plate 41. Thus, the rigidity to torsional deformation as illustrated in FIG. 15F is lowered. As a result, the resonant frequency of the torsional vibration in the secondary natural vibration mode in the direction of the sides D1 becomes approximately equal to that of the related-art vibration wave motor. As a result, the first characteristic can be achieved.

A second characteristic lies in that the projection 41a is provided at a position closer to the antinode Mb3 than to the node Mb1 among the node Mb1 and the antinodes Mb2 and Mb3 in the direction orthogonal to the torsion center axis Ma1 of the torsional vibration in the secondary natural vibration mode, as illustrated in FIG. 15E.

A third characteristic lies in that the projection 41a is provided at a position closer to the antinode Na2 than to the node Na1 among the node Na1 and the antinode Na2 of the bending vibration in the primary natural vibration mode, as illustrated in FIG. 15E.

Figure 16A:
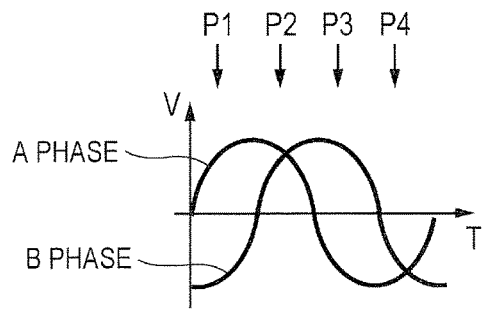
FIG. 16A, FIG. 16B and FIG. 16C are a graph and diagrams for illustrating speed control of the vibration wave motor according to the fifth embodiment of the present invention.
Figure 16C:
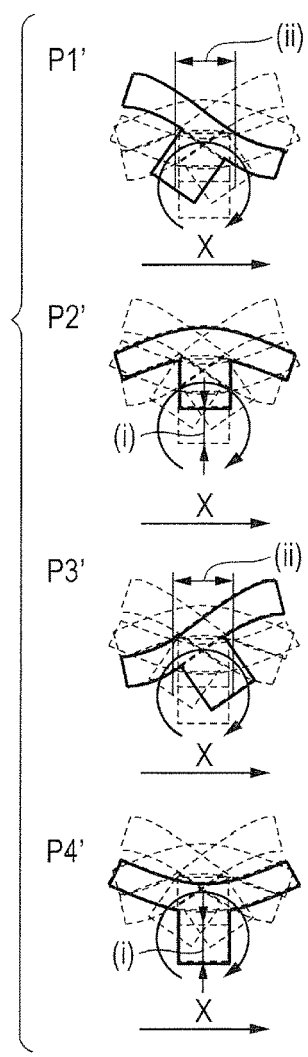
Figure 16B:
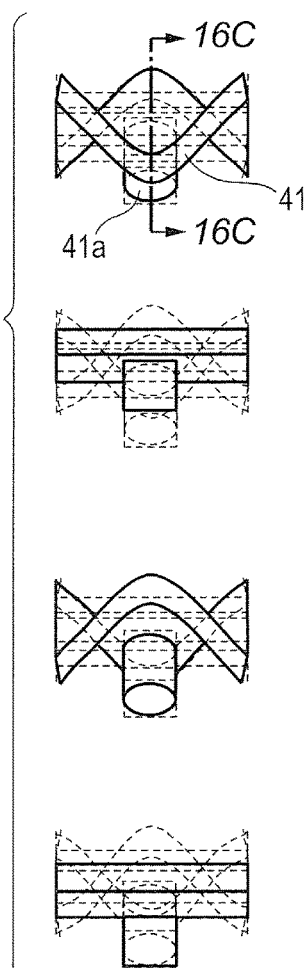

FIG. 16A to FIG. 16C are a graph and diagrams for illustrating a state of vibration when the AC voltages are applied with the B-phase being delayed by about +90° with respect to the A-phase, and correspond to FIG. 2A to FIG. 2D of the first embodiment. FIG. 16A is a graph for showing changes in the AC voltages applied to the A-phase and the B-phase of the piezoelectric devices 42 and 43, FIG. 16B is a front view corresponding to FIG. 15B, and FIG. 16C is a sectional view taken along the line 16C-16C of FIG. 16B. P1' to P4' indicate changes in vibration with time. The illustration of the piezoelectric devices 42 and 43 and the coupling portions 41c and 41d is omitted. With respect to electric changes P1 to P4 in the AC voltage shown in FIG. 16A, the mechanical changes P1' to P4' in the vibration illustrated in FIG. 16B and FIG. 16C have a predetermined mechanical response delay time. An amplitude of the vibration is illustrated in an exaggerated manner.

By applying the AC voltages with the B-phase being delayed by about +90° with respect to the A-phase, circular motion as illustrated in FIG. 16A to FIG. 16C occurs at a distal end of the projection 41a. Therefore, the thrust force can be obtained in the X-direction illustrated in FIG. 16A to FIG. 16C, which is the same as in the first embodiment. In a case where the AC voltages are applied with the B-phase being advanced by about +90° with respect to the A-phase, circular motion in the direction opposite to that in FIG. 16A to FIG. 16C occurs. Therefore, the thrust force in the opposite direction can be obtained, which is also the same as in the first embodiment. Further, by applying the AC voltages with little phase difference between the B-phase and the A-phase, the oblong elliptic motion as illustrated in FIG. 3A to FIG. 3D occurs at the distal end of the projection 41a. As a result, the motion at an extremely low speed is enabled, which is also the same as in the first embodiment.

The vibration wave motor 50 of the fifth embodiment and the related-art vibration wave motor 600 are compared with each other referring to FIG. 16A to FIG. 16C and FIG. 21A to FIG. 21D. The related-art vibration wave motor moves in the direction of the longer sides D1 (in the direction indicated by the arrow X in FIG. 21A to FIG. 21D). On the other hand, in the fifth embodiment, the vibration wave motor 50 can move in the direction of the sides D2 (in the direction indicated by the arrow X in FIG. 16A to FIG. 16C). Therefore, a size of the vibration wave motor in the movement direction can be reduced. When FIG. 15A to FIG. 15H and FIG. 20A to FIG. 21D are compared with each other, an area of each of the piezoelectric devices 42 and 43 of the fifth embodiment is smaller than that of the piezoelectric device of the related-art vibration wave motor. However, the vibration wave motor 50 of the fifth embodiment includes the portion 44 that is not covered with the piezoelectric devices 42 and 43, which is provided inside the vibrating plate 41. Therefore, the rigidity to torsional deformation as illustrated in FIG. 15F is lowered. As a result, by setting the design values described above relating to the first characteristic to appropriate values, the resonant frequency of the torsional vibration in the secondary natural vibration mode in the direction of the sides D1 becomes approximately equal to that of the related-art vibration wave motor. As a result, an amplitude (indicated by (i) and (ii) in FIG. 16A to FIG. 16C) close to that of the related-art vibration wave motor is obtained. Therefore, the thrust force close to that obtained in the related-art vibration wave motor can be obtained.

As described above, the resonant frequency of the vibration wave motor of the fifth embodiment becomes approximately equal to that of the related-art vibration wave motor by setting the design values described above relating to the first characteristic to appropriate values. The vibration wave motor of the fifth embodiment can move in the shorter-side direction (in the direction indicated by the arrow X in FIG. 16A to FIG. 16C) that is orthogonal to the torsion center axis. As a result, the size of the vibration wave motor in the movement direction can be reduced without greatly losing the thrust force. By using the vibration wave motor, downsizing of a driving apparatus can be achieved.

With the configuration illustrated in FIG. 4A and FIG. 4B and the configuration illustrated in FIG. 5A to FIG. 5C of the first embodiment by using the vibration wave motor 50 of the fifth embodiment, the same effects can be obtained in the linear driving apparatus and the lens driving apparatus.

Further, similarly to the first embodiment, the vibrating plate 41 may be fixed, and the coupling portions 41c and 41d may be provided to the sides D1 parallel to the torsion center axis of the vibrating plate 41. Further, the same effects can be realized by providing the coupling portions 41c and 41d to any portion of the vibrating plate 41 and the piezoelectric devices 42 and 43 as long as a condition that the vibration of the vibrating plate 41 and the piezoelectric devices 42 and 43 is scarcely affected is satisfied, which is also the same as in the first embodiment.

In the fifth embodiment, the piezoelectric device is divided into the two piezoelectric devices 42 and 43. The portion 44 that is not covered with the piezoelectric devices 42 and 43 is provided inside the vibrating plate 41. In this manner, the rigidity to the torsional deformation as illustrated in FIG. 15F is lowered. However, the same effects are obtained as long as the portion 44 that is not covered with the piezoelectric devices 42 and 43 is provided inside the vibrating plate 41. FIG. 17A to FIG. 17H are illustrations of an example thereof. A piezoelectric device 42' includes an elongated hole 45 having a width W formed inside the piezoelectric device 42' without dividing the piezoelectric device 42'. In this manner, the rigidity to the torsional deformation as illustrated in FIG. 15F is lowered. Further, the number of the elongated holes 45 is not limited to one, and a plurality of elongated holes may be formed.

In the fifth embodiment, the example where the natural vibration mode of the torsional vibration is the secondary natural vibration mode of the torsional vibration and the natural vibration mode of the bending vibration is the primary natural vibration mode of the bending vibration has been described. However, the same effects are obtained even in other higher-order vibration modes, which is also the same as in the first embodiment.

Sixth Embodiment

Now, a sixth embodiment for carrying out the present invention is described.

Figure 18F:

FIG. 18A to FIG. 18H are diagrams for illustrating a configuration of a vibration wave motor 60 of the sixth embodiment. FIG. 18A is a plan view, FIG. 18B is a front view, FIG. 18C and FIG. 18D are side views, and FIG. 18E is a bottom view. As illustrated in FIG. 18A to FIG. 18H, the vibration wave motor 60 includes a vibrating plate 51 having a rectangular surface and one projection 51a provided on the rectangular surface of the vibrating plate 51. The projection 51a may be integrally molded with the vibrating plate 51 through drawing or may be formed by bonding a separate member on the vibrating plate 51.

Onto a surface of the vibrating plate 51, which is on a side opposite to the side where the projection 51a is provided, two piezoelectric devices 52 and 53 that vibrate at high frequency are bonded. The piezoelectric devices 52 and 53 include two regions 52a and 53b obtained by polarization in the same direction. The region 52a is allocated to the A-phase, whereas the region 53b is allocated to the B-phase. Unpolarized regions 52c and 53c are electrodes to be used as grounds that are conductive to full-scale electrodes on a back surface 52d of the piezoelectric device 52 and a back surface 53d of the piezoelectric device 53 through side surfaces. The unpolarized regions 52c and 53c can be located at any positions as long as the regions 52c and 53c are conductive to the full-scale electrodes on the back surface 52d of the piezoelectric device 52 and the back surface 53d of the piezoelectric device 53 through the side surfaces.

Coupling portions 51c and 51d to be directly or indirectly coupled to the holding member configured to hold a vibrator similar to that of the first embodiment are provided to the vibrating plate 51 at portions illustrated in FIG. 18A to FIG. 18H, and move in synchronization with the vibrating plate 51. The coupling portions 51c and 51d are provided to the portions where displacement due to the vibration of the vibrating plate 51 and the piezoelectric devices 52 and 53 is small as described later, and therefore have shapes that are unlikely to inhibit the vibration. Therefore, the coupling portions 51c and 51d scarcely affect the vibration of the vibrating plate 51 and the piezoelectric devices 52 and 53. The vibrating plate 51, the piezoelectric devices 52 and 53, and the projection 51a described above form the vibration wave motor 60.

In FIG. 18E, nodes and antinodes of each of the torsional vibration in the secondary natural vibration mode in the direction of the sides D1 and the bending vibration in the primary natural vibration mode in the direction of the sides D1 under a state in which the vibrating plate 51, the piezoelectric devices 52 and 53, and the projection 51a are integrated, are indicated by the alternate short and long dash lines. FIG. 18F is a view of the torsional vibration in the secondary natural vibration mode in the direction of the sides D1 as viewed in a direction indicated by the arrow d1, whereas FIG. 18G is a view of the torsional vibration in the secondary natural vibration mode in the direction of the sides D1 as viewed in a direction indicated by the arrow d2.

Figure 18H:
Figure 22A:
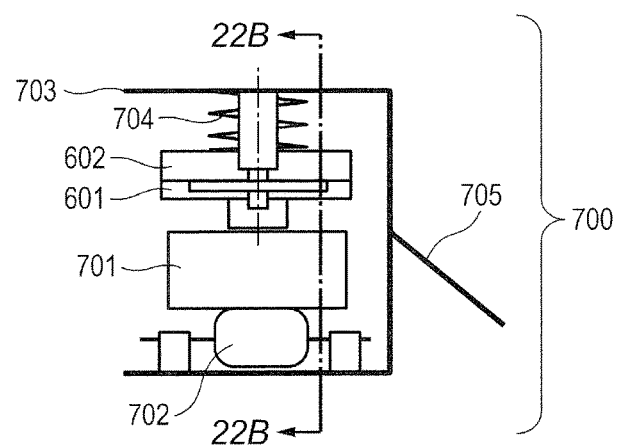
FIG. 22A and FIG. 22B are diagrams for illustrating a configuration of a related-art linear driving apparatus.
Figure 22B:
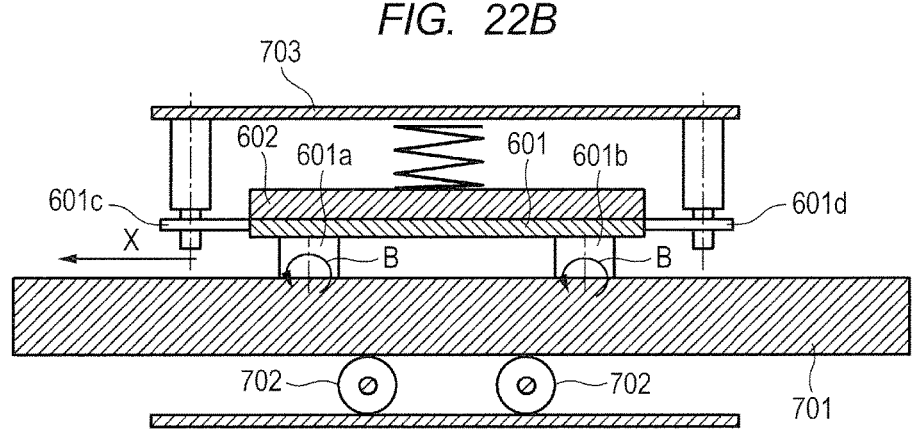
Figure 23A:
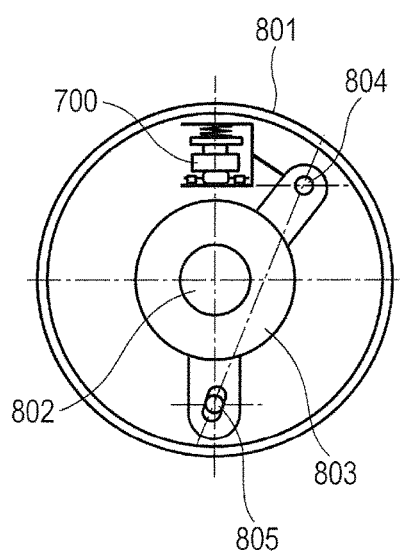
FIG. 23A, FIG. 23B and FIG. 23C are diagrams for illustrating a configuration of a related-art lens driving apparatus.
Figure 23B:
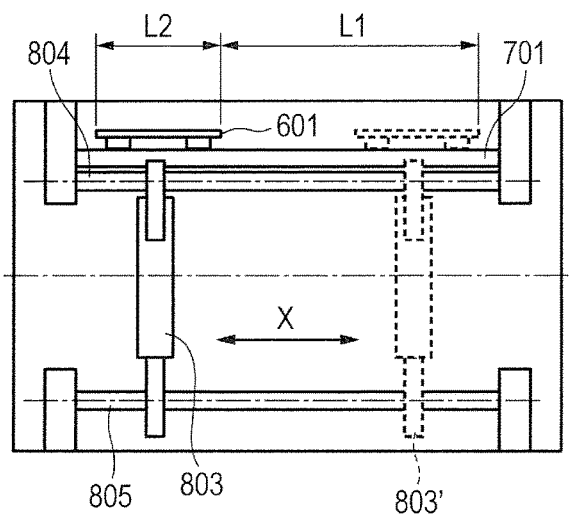
Figure 23C:
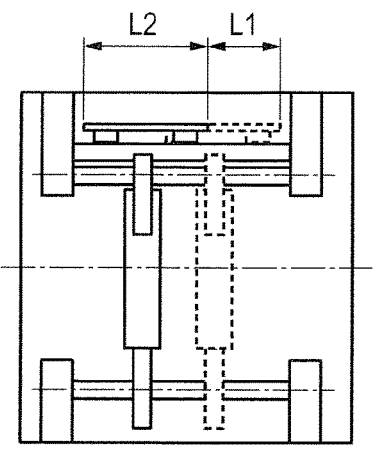

Further, FIG. 18H is a view of the bending vibration in the primary natural vibration mode in the direction of the sides D1 as viewed in the direction indicated by the arrow d1. In FIG. 18F, FIG. 18G, and FIG. 18H, the illustration of the projection 51a, the coupling portions 51c and 51d, and the piezoelectric devices 52 and 53 is omitted. As illustrated in FIG. 18E, the node Ma1 serves as the torsion center axis of the torsional vibration in the secondary natural vibration mode. The antinode Mat is parallel to the torsion center axis Ma1 of the torsional vibration in the secondary natural vibration mode. The node Mb1 is a node in the direction orthogonal to the torsion center axis Ma1 of the torsional vibration in the secondary natural vibration mode. The antinodes Mb2 and Mb3 are antinodes in the direction orthogonal to the torsion center axis Ma1 of the torsional vibration in the secondary natural vibration mode. The node Na1 is a node of the bending vibration in the primary natural vibration mode. The antinode Na2 is an antinode of the bending vibration in the primary natural vibration mode. Further, by applying the AC voltages from a power feeding unit (not shown) with a phase difference between the A-phase and the B-phase being freely changed, the vibration can be caused.

In this case, the coupling portions 51c and 51d are provided in the vicinity of intersections between the nodes Ma1 and Mb1 that are the nodes of the torsional vibration in the secondary natural vibration mode and between the node Ma1 and the node Na1 that is the node of the bending vibration in the primary natural vibration mode. As a result, the coupling portions 51c and 51d are provided to portions where displacement due to the vibration of the vibrating plate 51 and the piezoelectric devices 52 and 53 is small, and therefore have shapes that are unlikely to inhibit the vibration. Therefore, the coupling portions 51c and 51d scarcely affect the vibration of the vibrating plate 51 and the piezoelectric devices 52 and 53. The positions of the coupling portions 51c and 51d are not limited to those illustrated in FIG. 18A to FIG. 18H as long as the coupling portions 51c and 51d are located in the vicinity of the nodes Ma1 and Mb1 that are the nodes of the torsional vibration in the secondary natural vibration mode and the node Na1 that is the node of the bending vibration in the primary natural vibration mode. Further, because the coupling portions 51c and 51d only need to be provided to portions where displacement due to the vibration of the vibrating plate 51 and the piezoelectric devices 52 and 53 is small, the positions of the coupling portions 51c and 51d are not limited to the vicinity of the nodes of the vibration.

Now, three characteristics relating to the natural vibration modes and the arrangement of the projections according to the sixth embodiment are described.

A first characteristic lies in that a natural vibration mode with a resonant frequency that is equal to or adjacent to a resonant frequency of the torsional vibration in the secondary natural vibration mode is the primary natural vibration mode of the bending vibration in the direction parallel to the torsion center axis Ma1 of the torsional vibration in the secondary natural vibration mode. This characteristic is achieved by setting design values such as sizes in the direction of the sides D1 and the direction of the sides D2, a width W of a portion 54 inside the vibrating plate 51, which is not covered with the piezoelectric devices 52 and 53, thicknesses of the vibrating plate 51 and the piezoelectric devices 52 and 53, and rigidities of the vibrating plate 51 and the piezoelectric devices 52 and 53 to appropriate values.

A combination of appropriate values of the design values described above is not limited to one, and various combinations can be set. Now, the sixth embodiment and the first embodiment are compared with each other for a size of the side D1. Then, the size of each of the sides D1 of the sixth embodiment is smaller. If the size of the side D1 is simply reduced, the resonant frequency of the torsional vibration in the secondary natural vibration mode in the direction of the sides D1 increases, failing to achieve the first characteristic described above. In the sixth embodiment, however, the portion 54 that is not covered with the piezoelectric devices 52 and 53 is provided inside the vibrating plate 51. Thus, the rigidity to torsional deformation as illustrated in FIG. 18F is lowered. As a result, the resonant frequency of the torsional vibration in the secondary natural vibration mode in the direction of the sides D1 becomes approximately equal to that of the related-art vibration wave motor. As a result, the first characteristic can be achieved.

A second characteristic lies in that the projection 51a is provided at a position closer to the antinode Mb3 than to the node Mb1 among the node Mb1 and the antinodes Mb2 and Mb3 in the direction orthogonal to the torsion center axis Ma1 of the torsional vibration in the secondary natural vibration mode, as illustrated in FIG. 18E.

A third characteristic lies in that the projection 51a is provided at a position closer to the antinode Na2 than to the node Na1 among the node Na1 and the antinode Na2 of the bending vibration in the primary natural vibration mode, as illustrated in FIG. 18E.

FIG. 19A to FIG. 19C are a graph and diagrams for illustrating a state of vibration when the AC voltages are applied with the B-phase being delayed by about +90° with respect to the A-phase, and correspond to FIG. 2A to FIG. 2D of the first embodiment. FIG. 19A is a graph for showing changes in the AC voltages applied to the A-phase and the B-phase of the piezoelectric device, FIG. 19B is a front view corresponding to FIG. 18B, and FIG. 19C is a sectional view taken along the line 19C-19C of FIG. 19B. P1' to P4' indicate changes in vibration with time. The illustration of the piezoelectric devices 52 and 53 and the coupling portions 51c and 51d is omitted. With respect to electric changes P1 to P4 in the AC voltage shown in FIG. 19A, the mechanical changes P1' to P4' in the vibration illustrated in FIG. 19B and FIG. 19C have a predetermined mechanical response delay time. An amplitude of the vibration is illustrated in an exaggerated manner.

By applying the AC voltages with the B-phase being delayed by about +90° with respect to the A-phase, circular motion as illustrated in FIG. 19A to FIG. 19C occurs at a distal end of the projection 51a. Therefore, the thrust force can be obtained in the X-direction illustrated in FIG. 19A to FIG. 19C, which is the same as in the case of the first embodiment. In a case where the AC voltages are applied with the B-phase being advanced by about +90° with respect to the A-phase, circular motion in the direction opposite to that in FIG. 19A to FIG. 19C occurs. Therefore, the thrust force in the opposite direction can be obtained, which is also the same as in the first embodiment. Further, by applying the AC voltages with little phase difference between the B-phase and the A-phase, the oblong elliptic motion as illustrated in FIG. 3A to FIG. 3D occurs at the distal end of the projection 51a. As a result, the motion at an extremely low speed is enabled, which is also the same as in the first embodiment.

The vibration wave motor 60 of the sixth embodiment and the related-art vibration wave motor 600 are compared with each other referring to FIG. 19A to FIG. 19C and FIG. 21A to FIG. 21D. The related-art vibration wave motor 600 moves in the direction of the longer sides D1 (in the direction indicated by the arrow X in FIG. 21A to FIG. 21D). On the other hand, in the sixth embodiment, the vibration wave motor 60 can move in the direction of the sides D2 (in the direction indicated by the arrow X in FIG. 19A to FIG. 19C). Therefore, a size of the vibration wave motor 60 in the movement direction can be reduced.

When FIG. 18A to FIG. 18H and FIG. 20A to FIG. 20G are compared with each other, an area of each of the piezoelectric devices 52 and 53 of the sixth embodiment is smaller than that of the piezoelectric device of the related-art vibration wave motor. However, the vibration wave motor 60 of the sixth embodiment includes the portion 54 that is not covered with the piezoelectric devices 52 and 53, which is provided inside the vibrating plate 51. Therefore, the rigidity to torsional deformation as illustrated in FIG. 18F is lowered. As a result, by setting the design values described above relating to the first characteristic to appropriate values, the resonant frequency of the torsional vibration in the secondary natural vibration mode in the direction of the sides D1 becomes approximately equal to that of the related-art vibration wave motor. As a result, an amplitude (indicated by (i) and (ii) in FIG. 16C) close to that of the related-art vibration wave motor is obtained. Therefore, the thrust force close to that obtained in the related-art vibration wave motor can be obtained.

As described above, the resonant frequency of the vibration wave motor 60 of the sixth embodiment becomes approximately equal to that of the related-art vibration wave motor by setting the design values described above relating to the first characteristic to appropriate values. The vibration wave motor of the sixth embodiment can move in the shorter-side direction (in the direction indicated by the arrow X in FIG. 19A to FIG. 19C) that is orthogonal to the torsion center axis. As a result, the size of the vibration wave motor in the movement direction can be reduced without losing the thrust force. By using the vibration wave motor, downsizing of a driving apparatus can be achieved.

With the configuration illustrated in FIG. 4A and FIG. 4B and the configuration illustrated in FIG. 5A to FIG. 5C by using the vibration wave motor 60 of the sixth embodiment, the same effects can be obtained in the linear driving apparatus and the lens driving apparatus.

Further, as described in the first embodiment, the vibrating plate 51 may be fixed, and the coupling portions 51c and 51d may be provided to the sides D1 or the sides D2. Further, the same functions can be realized by providing the coupling portions 51c and 51d to any of the vibrating plate 51 and the piezoelectric devices 52 and 53 as long as a condition that the vibration of the vibrating plate 51 and the piezoelectric devices 52 and 53 is scarcely affected is satisfied, which is also the same as in the first embodiment.

In the sixth embodiment, the piezoelectric device is divided into the two piezoelectric devices 52 and 53. The portion 54 that is not covered with the piezoelectric devices 52 and 53 is provided inside the vibrating plate 51. In this manner, the rigidity to the torsional deformation as illustrated in FIG. 18F is lowered. However, if the portion 54 that is not covered with the piezoelectric devices is provided inside the vibrating plate as illustrated in FIG. 17A to FIG. 17H even though the piezoelectric devices are integral, the same effects are obtained, which is also the same as in the fifth embodiment.

In the sixth embodiment, the example where the natural vibration mode of the torsional vibration is the secondary natural vibration mode of the torsional vibration and the natural vibration mode of the bending vibration is the primary natural vibration mode of the bending vibration has been described. However, the same effects are obtained even in other higher-order vibration modes, which is also the same as in the first embodiment. In each of the embodiments, two or more projections can be provided. Further, the vibration wave motor is, for example, an ultrasonic motor in which a vibrating plate vibrates at an ultrasonic frequency.

The present invention is available for electronic equipment that is required to be small-sized and lightweight and to have a wide driving-speed range, in particular, a lens driving apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-218080, filed Oct. 27, 2014, which is hereby incorporated by reference herein in its entirety.

What is claimed is:

1. A vibration wave motor, comprising:
a vibrating plate having a rectangular surface;
a piezoelectric device bonded onto the vibrating plate, and configured to vibrate at high frequency; and
a projection provided on one of the vibrating plate and the piezoelectric device, wherein
a natural vibration mode, which has a resonant frequency equal to or adjacent to a resonant frequency of torsional vibration in a natural vibration mode under a state in which the vibrating plate, the piezoelectric device, and the projection are integrated, is a natural vibration mode of bending vibration in one of a direction parallel to and a direction orthogonal to a torsion center axis of the torsional vibration in the natural vibration mode, and
the projection is provided at a position closer to an antinode than to a node, the node and the antinode being in the direction orthogonal to the torsion center axis of the torsional vibration in the natural vibration mode.

2. A vibration wave motor according to claim 1, wherein at least two projections are provided, and
an arbitrary two of the projections are prevented from sandwiching the node in the direction orthogonal to the torsion center axis of the torsional vibration in the natural vibration mode or sandwich an even number of the nodes.

3. A vibration wave motor according to claim 1, wherein the natural vibration mode of the torsional vibration is a secondary natural vibration mode of the torsional vibration.

4. A vibration wave motor according to claim 1, wherein the natural vibration mode of the bending vibration is a primary natural vibration mode of the bending vibration.

5. A vibration wave motor according to claim 1, wherein
a natural vibration mode, which has a resonant frequency equal to or adjacent to a resonant frequency of the torsional vibration in a secondary natural vibration mode, is a primary natural vibration mode of bending vibration in a direction orthogonal to a torsion center axis of the torsional vibration in the secondary natural vibration mode, and
the projection is provided at a position closer to an antinode than to a node of the bending vibration in the primary natural vibration mode.

6. A vibration wave motor according to claim 1, wherein
a natural vibration mode, which has a resonant frequency equal to or adjacent to a resonant frequency of the torsional vibration in a secondary natural vibration mode, is a primary natural vibration mode of bending vibration in a direction orthogonal to a torsion center axis of the torsional vibration in the secondary natural vibration mode; and
the projection is provided at a position closer to a node than to an antinode of the bending vibration in the primary natural vibration mode.

7. A vibration wave motor according to claim 1, wherein
a natural vibration mode, which has a resonant frequency equal to or adjacent to a resonant frequency of the torsional vibration in a secondary natural vibration mode, is a primary natural vibration mode of bending vibration in a direction parallel to a torsion center axis of the torsional vibration in the secondary natural vibration mode; and
the projection is provided at a position closer to an antinode than to a node of the bending vibration in the primary natural vibration mode.

8. A vibration wave motor according to claim 1, wherein the projection is provided on the rectangular surface of the vibrating plate.

9. A vibration wave motor according to claim 1, further comprising a coupling portion to be directly or indirectly coupled to a holding member configured to hold a vibrator moving in synchronization with the vibrating plate, the coupling portion being provided at a side orthogonal to the torsion center axis of the rectangular surface of the vibrating plate.

10. A vibration wave motor according to claim 1, further comprising a coupling portion to be directly or indirectly coupled to a holding member configured to hold a vibrator moving in synchronization with the vibrating plate, the coupling portion being provided at a side parallel to the torsion center axis of the rectangular surface of the vibrating plate.

11. A vibration wave motor according to claim 1, wherein the vibrating plate includes a portion that is prevented from being covered with the piezoelectric device.

12. A vibration wave motor according to claim 9, wherein the coupling portion to be directly or indirectly coupled to the holding member moving in synchronization with the vibrating plate is provided at a portion that is prevented from being covered with the piezoelectric device.

13. A vibration wave motor according to claim 1, further comprising a friction member held in contact with the vibrating plate, to which the vibrating plate moves relatively due to the high-frequency vibration of the vibrating plate,
wherein the vibrating plate is configured to move relative to the friction member in a direction orthogonal to the torsion center axis of the rectangular surface of the vibrating plate.

14. A vibration wave motor according to claim 1, further comprising a friction member configured to move along the fixed vibrating plate.

15. A vibration wave motor according to claim 1, wherein the vibration wave motor comprises an ultrasonic motor in which the vibrating plate vibrates at an ultrasonic frequency.

16. A driving apparatus, comprising a vibration wave motor,
the vibration wave motor comprising:
a vibrating plate having a rectangular surface;
a piezoelectric device bonded to the vibrating plate, and configured to vibrate at high frequency;
a projection provided on one of the vibrating plate and the piezoelectric device, wherein
a natural vibration mode, which has a resonant frequency equal to or adjacent to a resonant frequency of torsional vibration in a natural vibration mode under a state in which the vibrating plate, the piezoelectric device, and the projection are integrated, is a natural vibration mode of bending vibration in one of a direction parallel to and a direction orthogonal to a torsion center axis of the torsional vibration in the natural vibration mode, the projection is provided at a position closer to an antinode than to a node, the node and the antinode being in the direction orthogonal to the torsion center axis of the torsional vibration in the natural vibration mode, and the direction orthogonal to the torsion center axis of the rectangular surface of the vibrating plate is used as a driving direction.

17. A driving apparatus according to claim 16, wherein the vibration wave motor comprises an ultrasonic motor in which the vibrating plate vibrates at an ultrasonic frequency.

* * * * *